Dec. 15, 1942. E. E. MINOR ET AL 2,305,268
AIRCRAFT VIBRATION FLIGHT TESTING
Filed July 23, 1940 11 Sheets-Sheet 2
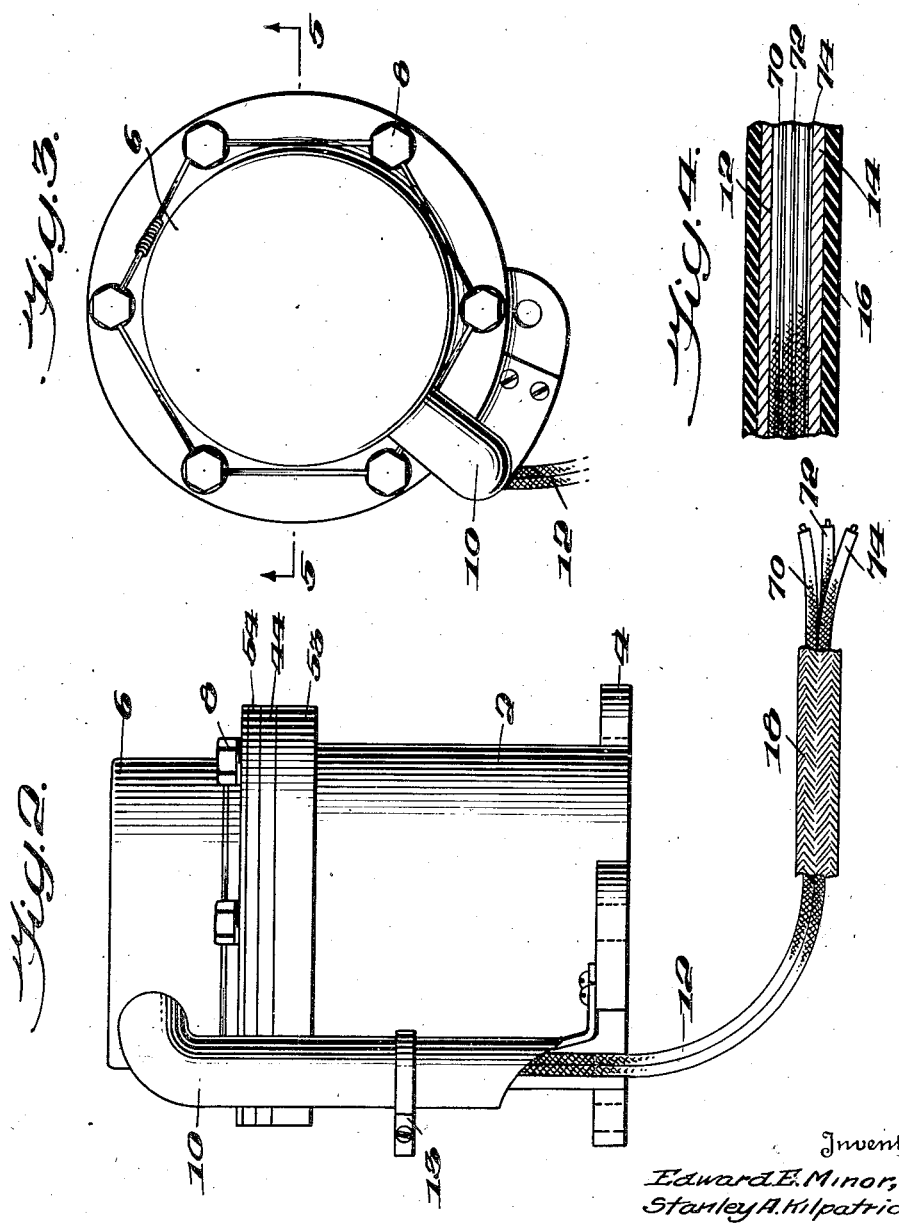
Inventors
Edward E. Minor,
Stanley A. Kilpatrick,
By
Attorney

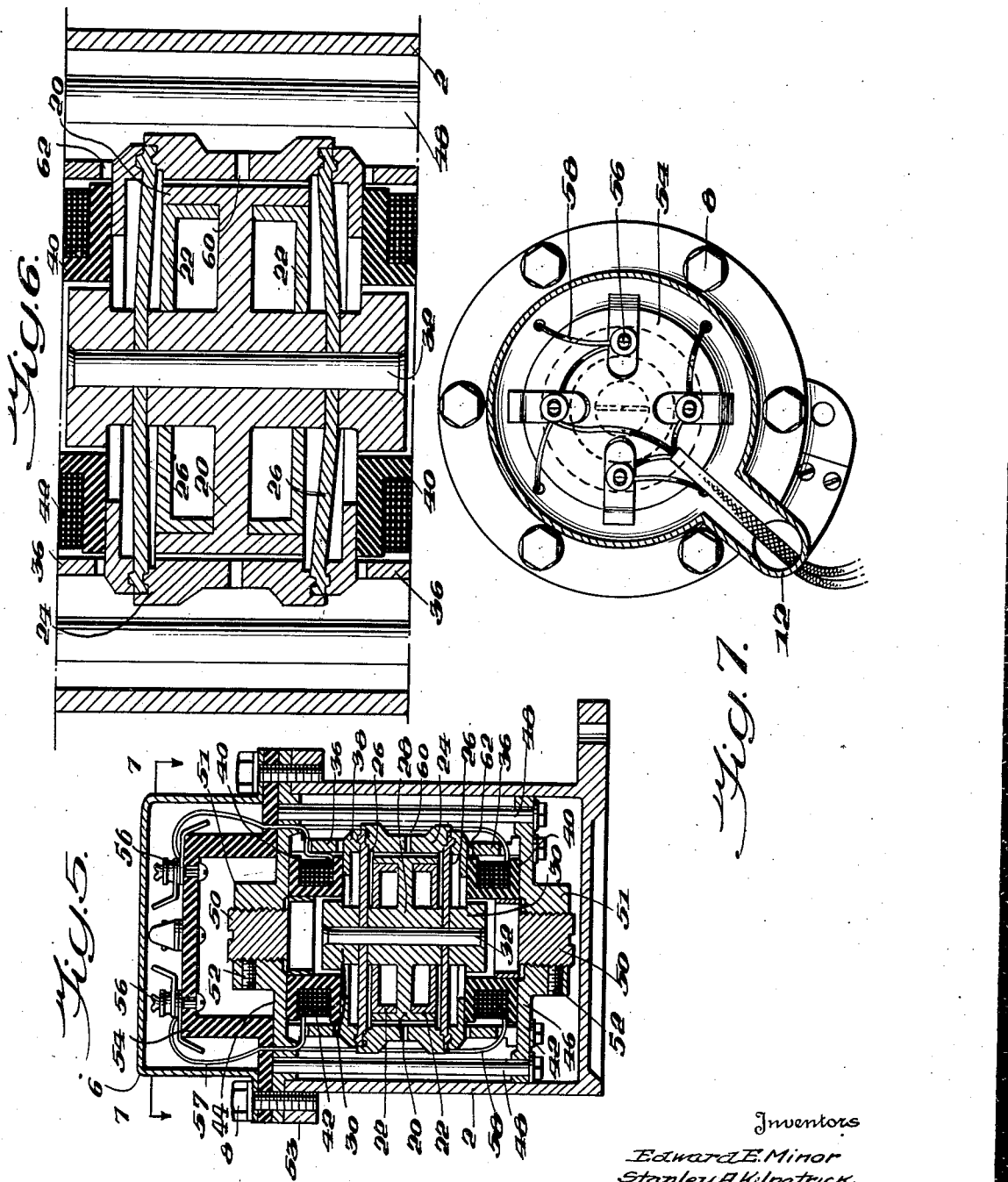

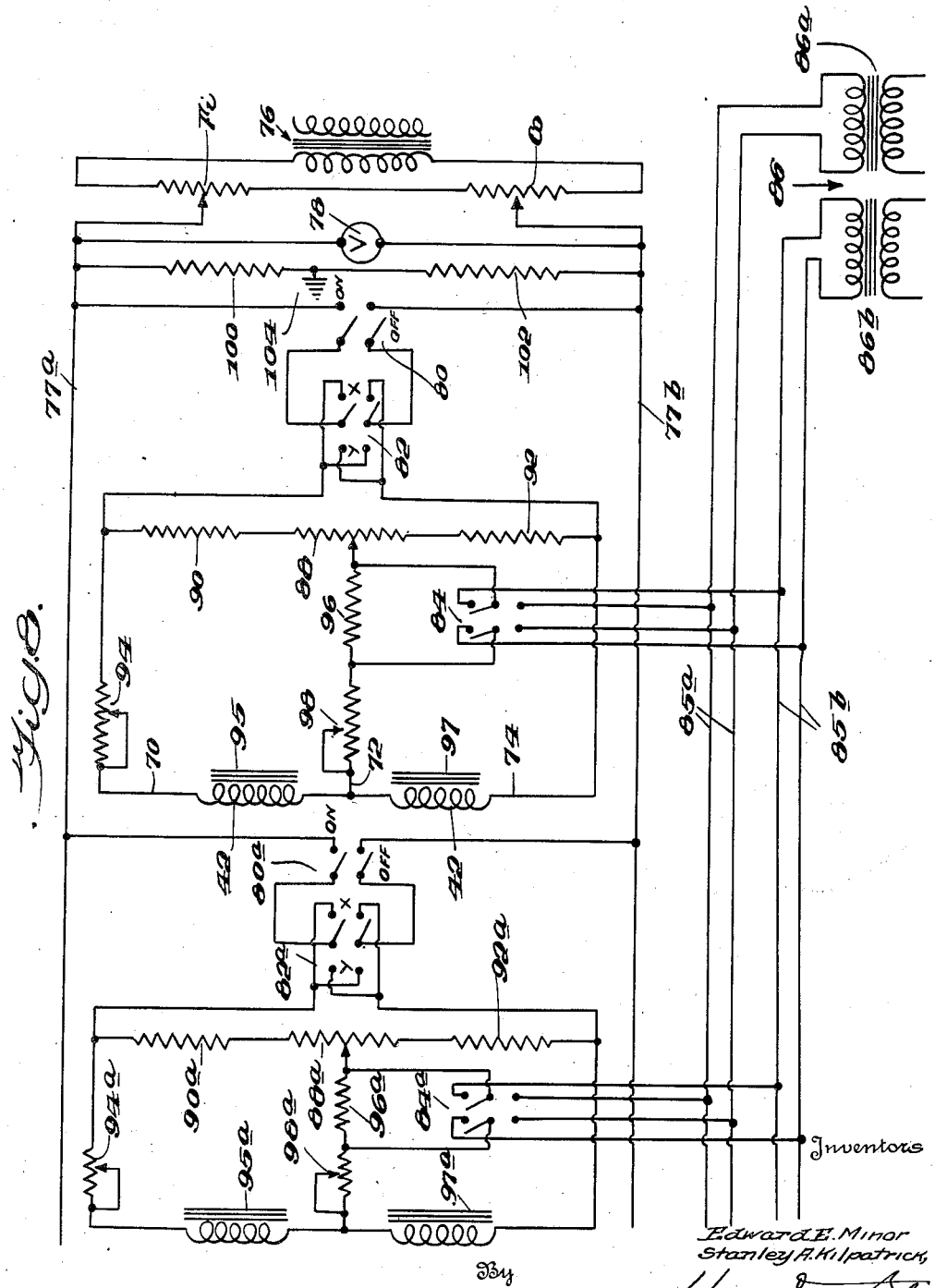

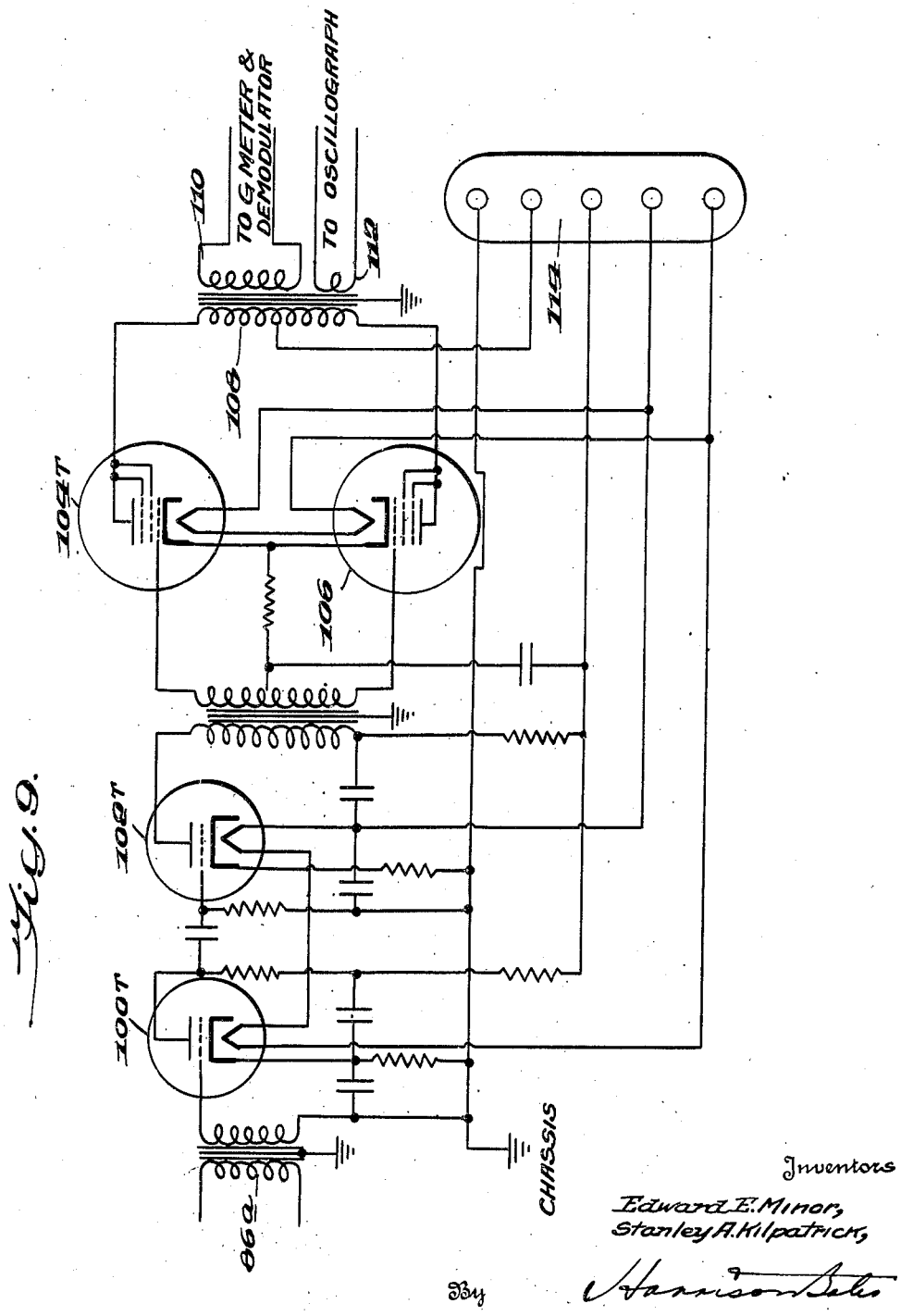

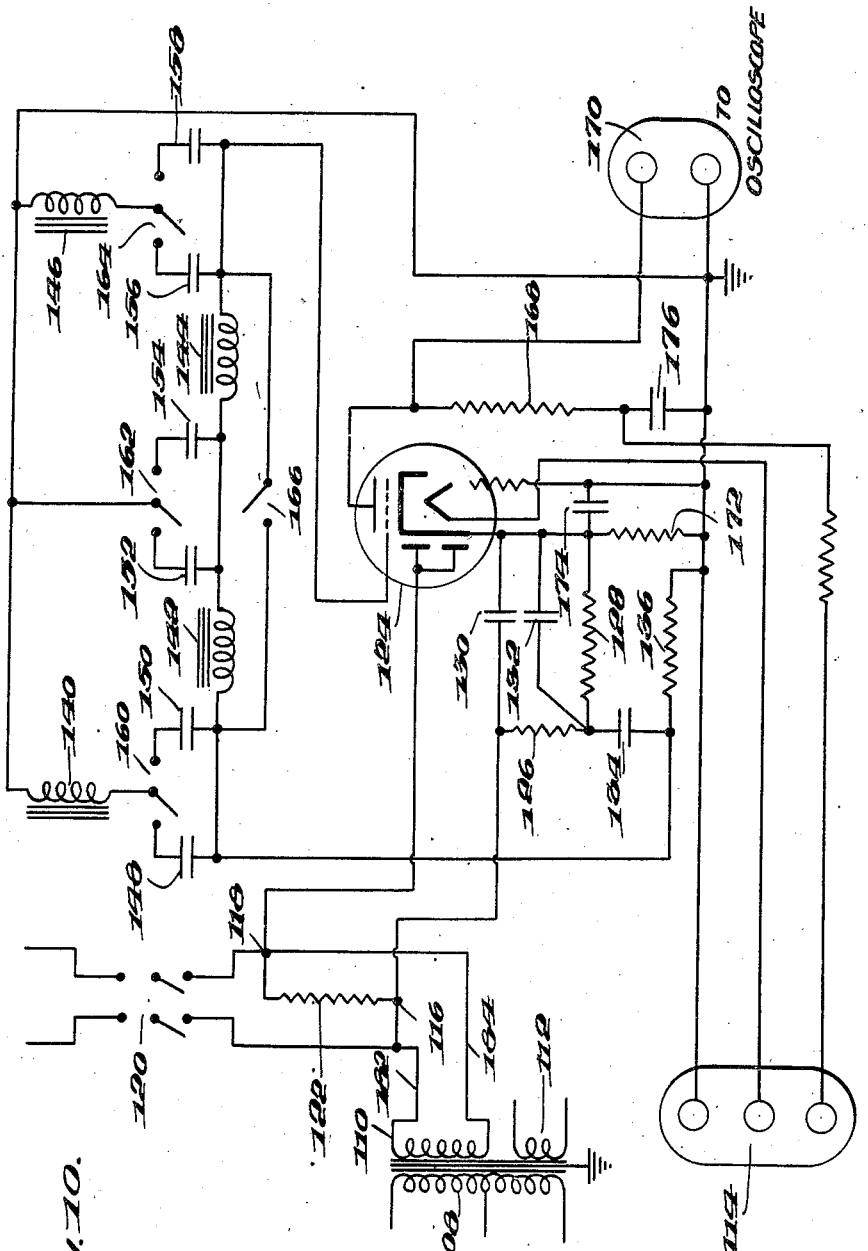

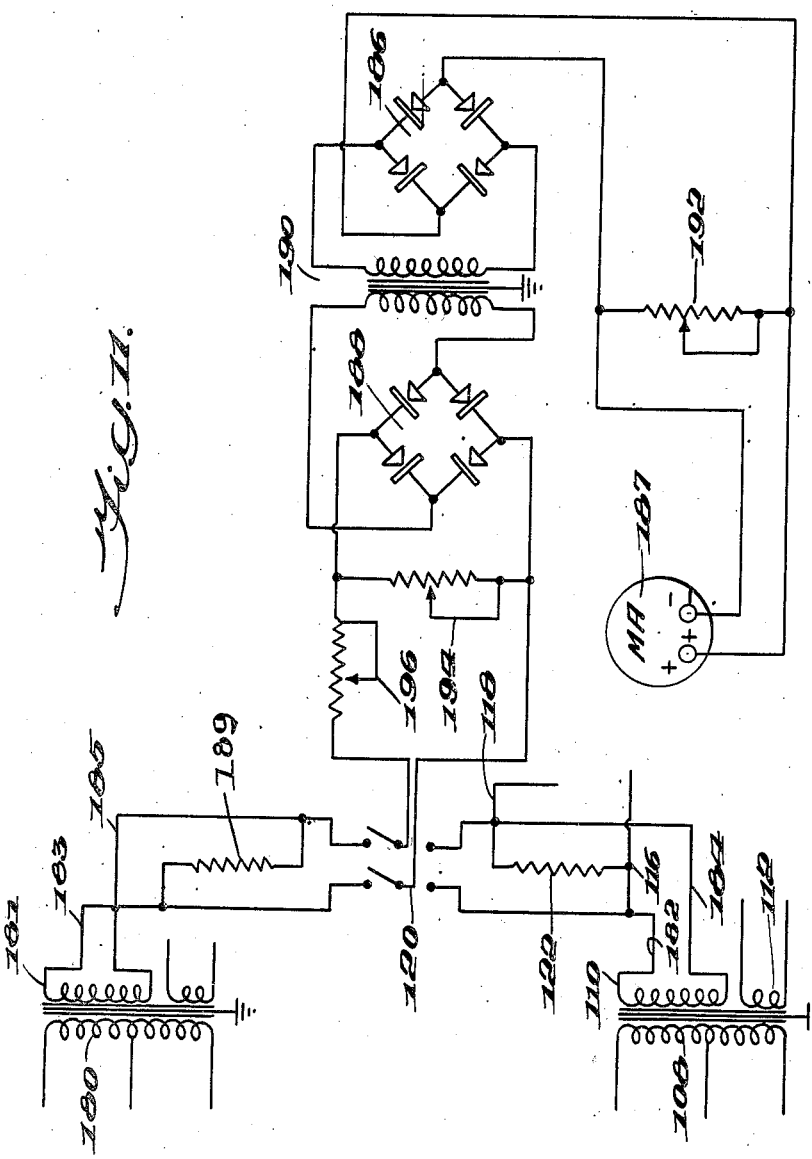

Dec. 15, 1942.  E. E. MINOR ET AL  2,305,268
AIRCRAFT VIBRATION FLIGHT TESTING
Filed July 23, 1940  11 Sheets-Sheet 8
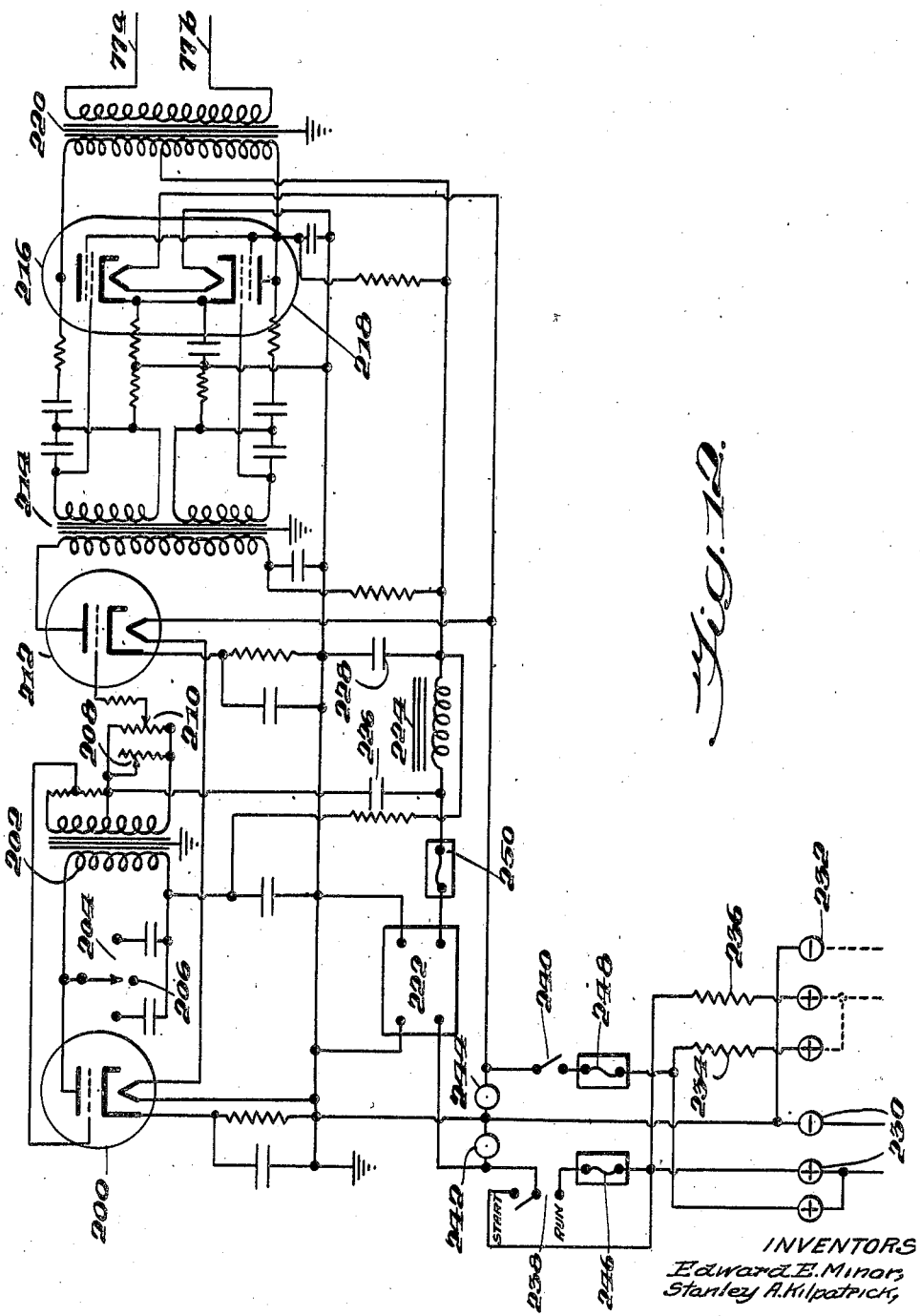
INVENTORS
Edward E. Minor,
Stanley A. Kilpatrick,
By
Attorney

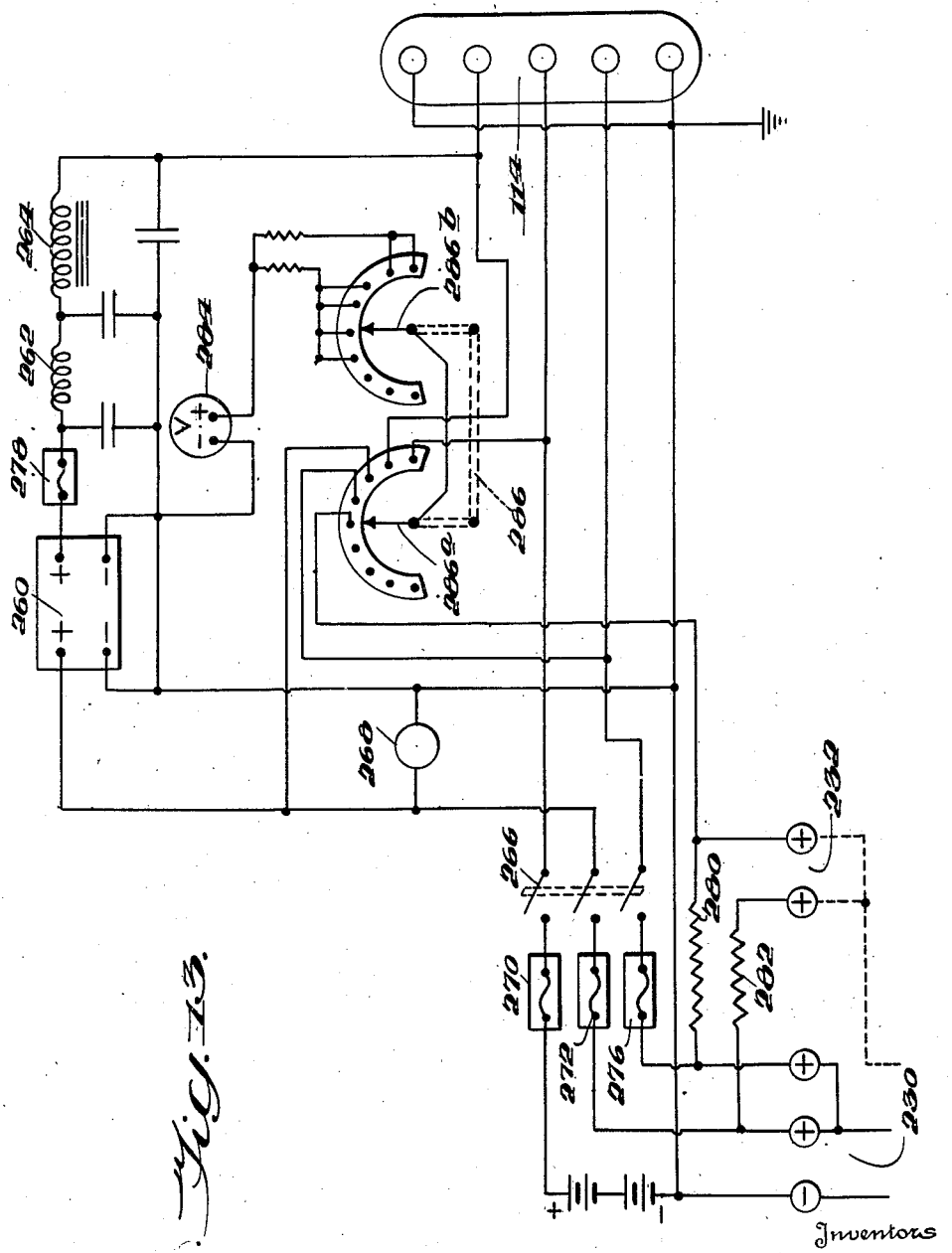

Dec. 15, 1942.　　E. E. MINOR ET AL　　2,305,268
AIRCRAFT VIBRATION FLIGHT TESTING
Filed July 23, 1940　　11 Sheets-Sheet 10
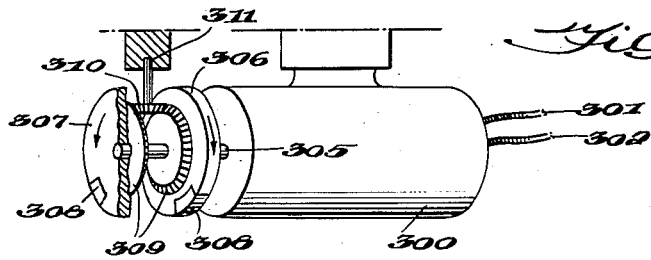
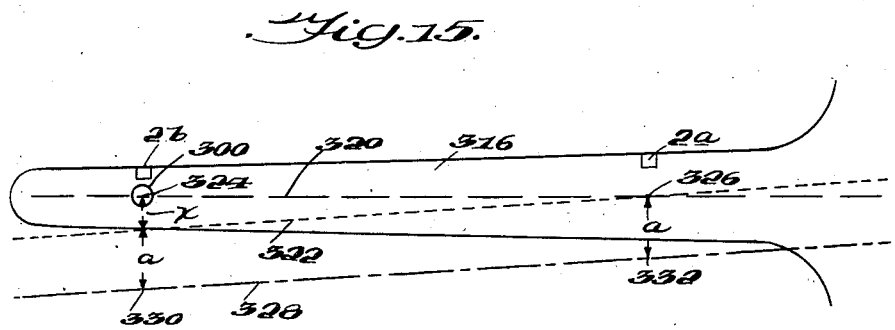
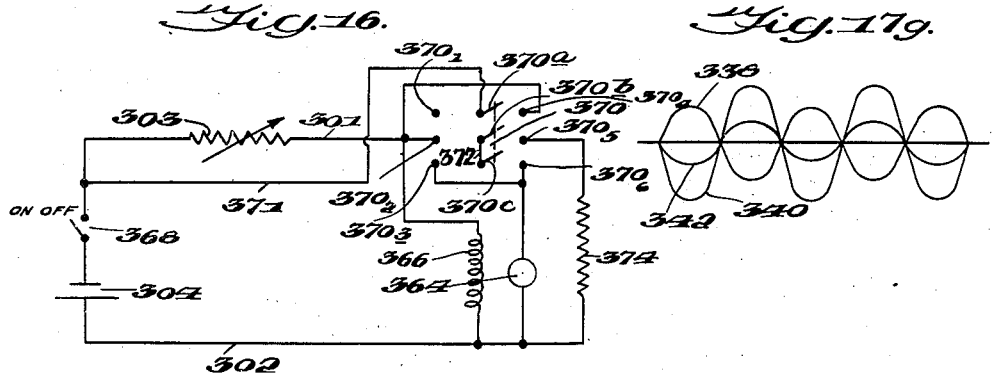
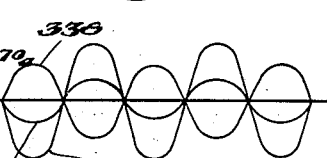
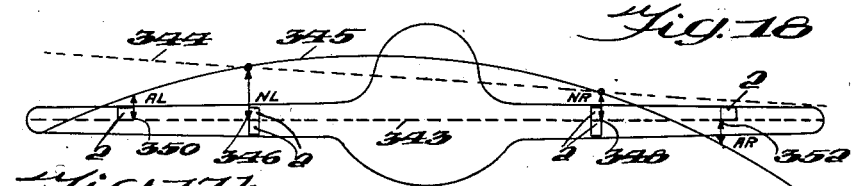
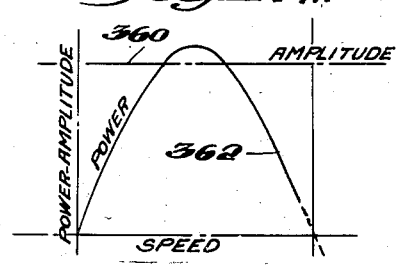
Inventors
Edward E. Minor,
Stanley A. Kilpatrick,
By
Attorney Dec. 15, 1942. E. E. MINOR ET AL 2,305,268
AIRCRAFT VIBRATION FLIGHT TESTING
Filed July 23, 1940  11 Sheets-Sheet 11

Inventors
Edward E. Minor,
Stanley A. Kilpatrick,

By  Harrison
Attorney

Patented Dec. 15, 1942

2,305,268

UNITED STATES PATENT OFFICE 2,305,268

AIRCRAFT VIBRATION FLIGHT TESTING

Edward E. Minor, Baltimore, and Stanley A. Kilpatrick, Raspeburg, Md., assignors to The Glenn L. Martin Company, Baltimore, Md.

Application July 23, 1940, Serial No. 346,906

10 Claims. (Cl. 73—51)

The invention relates to a measuring method, and particularly to a method for determining the flutter or other vibratory characteristics of aircraft.

This application is a continuation-in-part of our prior applications Serial Number 214,562, filed June 18, 1938, and Serial Number 288,530, filed August 5, 1939.

In the building of aircraft, it is generally impossible to predict accurately from mathematical calculations, the occurrence of structural vibrations of dangerous amplitude, within the desired operating speed range of the aircraft, due to the inherent characteristics of the aircraft while in free flight. Since the total effect of these forces can be detected only in actual flight, some part of the plane during testing often begins to flutter dangerously, and in many cases to a degree or for a time sufficient to cause breaking, which usually results in the loss of the aircraft and crew.

Flutter in an aircraft is dependent on the speed thereof with respect to the relative wind. Thus for any part such as a control surface, wing, or other external structural appendage there may exist a critical speed at which the type of self-induced structural vibration of large amplitude known as flutter may occur. This speed may be only slightly greater than a speed which is perfectly safe, and at which no self-induced vibration occurs. Thus as the speed of the ship is gradually increased during testing, it may suddenly reach the critical speed with the result that parts may begin to vibrate dangerously with practically no fore-warning.

The primary object of the present invention is to provide a method by which an aircraft may be tested and its flutter characteristics determined without actually producing dangerous flutter. Particularly, the invention contemplates the accurate determination, for any part, of the critical flutter speed therefor, without ever bringing the aircraft up to this speed.

Still another object of the invention is to make it possible to determine this critical speed while the aircraft is in flight so that in a single flight the desired information can be obtained by gradually stepping up the speed of the ship to a value below the critical speed at which the desired result may be determined.

Still another object of the invention is to make it possible to determine this critical speed in flight so that the desired information can be obtained for design changes to increase the critical speed to a value beyond the operating speed range of the aircraft. A still further object of the invention is to make it possible to determine that no such critical speed exists within the operating speed range of the aircraft.

We are aware that methods have been heretofore proposed for testing aircraft, but none of these has been adequate. For example, an article by B. von Schlippe, entitled "Zur Frage der selbsterregten Flugelschwingungen," published in "Luftfahrt forschung," vol. 13, No. 2, page 41, describes one such method. This procedure, however, is unsatisfactory and inadequate. The method described determines the displacement of only a single point of the part being tested, so that the effect of extraneous movements of the whole part having nothing to do with its flutter characteristics cannot be taken into account in calculating the characteristics. The von Schlippe method determines the amplitude alone at a single point, which, unless this point is properly determined by complicated and sometimes inaccurate calculations or by an accurate model in a wind tunnel test, is by itself insufficient under most conditions for the determination of the flutter speed and especially of the flutter characteristics of a particular airplane. This method uses artificial excitation at a known frequency, but with an unmeasured source of vibration of unknown power. Further, when using an artificial source of excitation, a substantially unvarying power is applied thereto, thus greatly increasing the load on the part when the natural and normal forces to which it is subjected begin to approach the danger point.

The use of vibration measuring apparatus is, of course, old and although the apparatus described by Draper, Bentley and Willis entitled the MIT Sperry "Apparatus for measuring vibration" published in the oJurnal of Aeronautical Sciences, 1937, vol. 17, page 281, relates specifically to aircraft vibration, it nevertheless does not recognize the need for equipment capable of measuring flutter characteristics and was, therefore, not designed nor can it be used generally for such purpose. One reason for this is that the equipment for measuring flutter characteristics must be capable of handling ranges of frequencies and amplitudes entirely different from those for which the special equipment described in this article was designed.

The present invention provides a method which differs in three essential respects from the procedures discussed above, each of these leading to an important increase in the ease and accuracy of the determination of critical flutter speed, or the like.

One important feature of the invention resides in the fact that the method includes combined ground and flight testing to determine accelerations of a plurality of points simultaneously. More particularly, the method includes the determination on the ground of nodes of the part to be tested. Then in flight the accelerations of nodal and non-nodal points are simultaneously determined. By properly combining the results, the accelerations which affect the whole part can be distinguished from those which occur within the part, so that the mode of vibration of the part and its flutter characteristics may be more accurately discovered.

A second important feature involves the use of an electrical method. This involves the translation of the corresponding accelerations of different points of the part being tested into electrical impulses, of proportional value and sign, and the combination of these electrical impulses to produce a single signal or indication which will supply to the observer the necessary information as to the final effect of all of the accelerations.

The third important feature is applicable when some artificial excitation is used. This is desirable in order to cause vibrations of the parts so as to render them susceptible of measurement in smooth air, without subjecting the aircraft to the action of gusts, and without relying on uncontrolled gust excitation which is sometimes dangerous. On the other hand, the superimposed artificial vibrations cannot by the measurement only of the amplitude or acceleration produced determine a critical speed or provide sufficient data to predict the critical speed. The present invention, on the other hand, includes the gradual reduction of and accurate measurement of the power which produces the artificial exciting force, in such a manner as to keep the total vibration always below a predetermined danger point. By measuring the power necessary to produce a constant acceleration the power is gradually reduced with increase in speed and the critical speed at which the part will begin to flutter to a dangerous extent can be predicted.

This feature is based on the fact that, from the power, the amplitude and the frequency, the damping force can be ascertained; and this damping force reaches zero at the critical speed. By extrapolating one or more of these variables the critical speed can therefore be determined.

A fourth feature of the invention lies in the determination of the power required to produce the constant acceleration of the point in question by the measurement of the difference in phase angle between the exciting force and the acceleration.

The method then will provide an accurate predetermination of the critical flutter speed of any part of the aircraft.

The invention, while described particularly as useful in the determination of flutter speeds, is also useful for measurement of other vibratory movements occurring in the operation of aircraft, or to any type of periodic instability.

Further objects and advantages of the invention will appear more fully from the following description, particularly when taken in conjunction with the accompanying drawings which form a part thereof.

In the drawings:

Fig. 2 is a side view of one of the pick-up units of the apparatus;

Fig. 3 is a plan view of Fig. 2;

Fig. 4 is an enlarged longitudinal section of the cable used in the cable leads for the pick-up device;

Fig. 5 is a cross-sectional view of the pick-up device on the line 5—5 of Fig. 3;

Fig. 6 is a greatly magnified view of the central portion of Fig. 5 showing the details thereof;

Fig. 7 is a cross-sectional view on the line 7—7 of Fig. 5;

Fig. 8 is a wiring diagram showing the bridge circuits and switches diagrammatically indicated in Fig. 1;

Fig. 9 is a wiring diagram showing the high frequency amplifier circuit for either the horizontal or vertical channel diagrammatically indicated in Fig. 1;

Fig. 10 is a wiring diagram showing the demodulator and the filter circuit for either the horizontal or vertical channel shown in Fig. 1;

Fig. 11 is a wiring diagram showing the "G-meter" circuit diagrammatically illustrated in Fig. 1;

Fig. 12 is a wiring diagram showing the oscillator diagrammatically indicated in Fig. 1 for supplying carrier frequency to the apparatus;

Fig. 13 is a wiring diagram showing the power supply circuit diagrammatically illustrated in Fig. 1 for supplying power to operate the amplifiers, and Fig. 14 is a perspective view of an artificial vibration exciting mechanism;

Fig. 15 is a view of an airplane part showing schematically the use of devices of the type shown in Fig. 14;

Fig. 16 is a wiring diagram of one of the devices of Fig. 15;

Figs. 17a to 17h inclusive, are curves illustrating various modes of operation of the apparatus;

Fig. 18 is a view showing schematically the use of pick-up devices on a whole wing of an aircraft.

Figure 1:
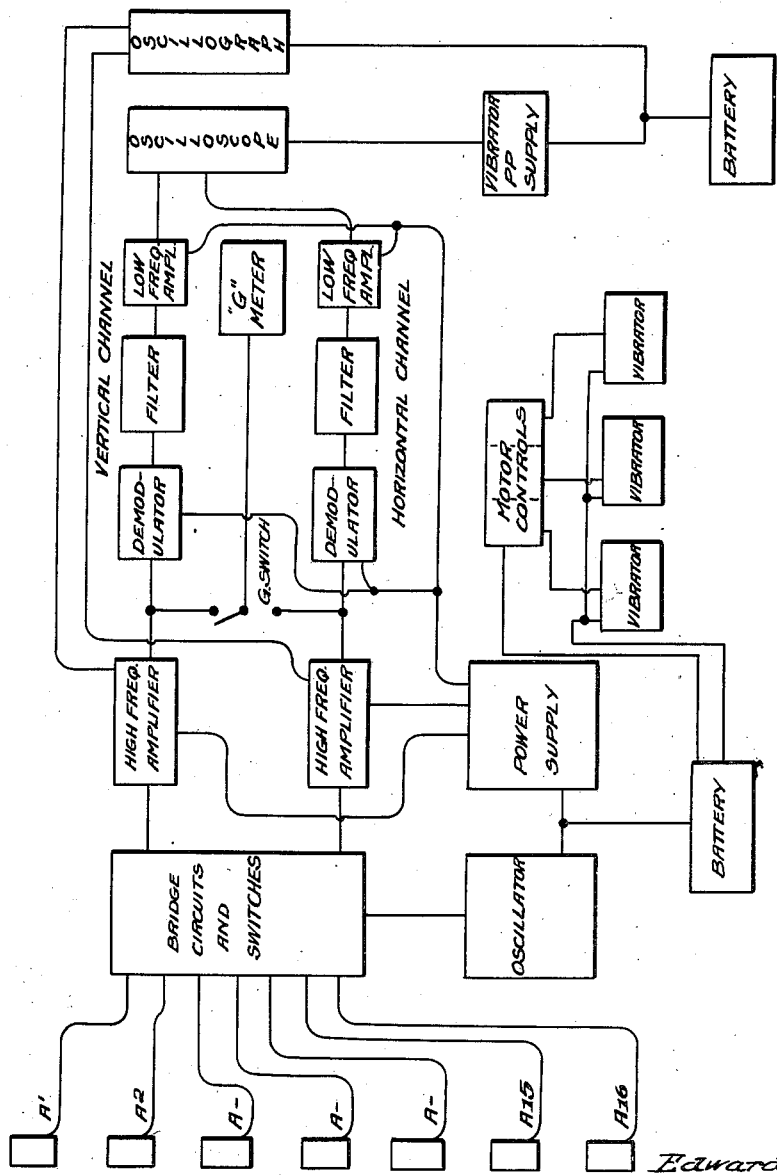
Fig. 1 is a diagrammatic chart showing the relationship of the various parts of the apparatus to each other.

In Fig. 1, the pick-up units are indicated at $A^1$, $A^2 \ldots A^{16}$. These units are placed upon the structure to be analyzed, and when the various structural parts to which they are fixed vibrate, the accelerations cause a modification in the electrical currents being passed through the individual pick-ups. The currents from various pick-ups are combined in the bridge circuit and switch device from which the currents are passed through the various amplifiers to modulators and filters until the demodulated currents reach the oscilloscope or oscillograph.

The pick-up unit which is referred to above is a mechanism by which accelerations imposed thereon produce a relative movement between an inductor and the frame of the pick-up unit which in turn causes changes in the inductances of two built-in coils; the inductances of one coil being increased as that of the other is decreased and vice versa. By means of additional equipment connected in a suitable electric circuit these changes in the inductance of the pick-up coils are effective in varying an electric voltage, with an associated electric current, in a manner representative of the initial mechanical acceleration of the structural part being analyzed.

Referring back to Fig. 1, the relation of the pick-up units to the general circuit becomes more apparent. In actual use, pick-up units $A^1$ to $A^{16}$ would probably be located some distance from the centralized measuring equipment, connection cables 70 feet long having been used. There is no practical limit to the length of cable which may be used. Housed in the centralized measuring equipment and corresponding to each pick-up unit is an electrical bridge circuit, which will be more fully described with reference to Fig. 8. Alternating current at audio-frequency is supplied to the bridge circuits by an output oscillator. This impressed frequency is referred to as the "carrier." The output voltage of each bridge circuit is determined by the voltage of the impressed carrier and by the degree of balance of the bridge circuit. This factor of bridge balance is directly affected by the position within the pick-up of its inductor, which in turn is controlled by the mechanical accelerations being imposed on an individual pick-up unit. Therefore the output voltage of each bridge circuit will consist of a carrier frequency component which is modulated in accordance with the mechanical acceleration to be measured.

The voltage output from the bridge circuit is amplified at one or the other of the two "high frequency amplifiers." Beginning with these amplifiers, it will be noted from Fig. 1 that there are two duplicate sets of equipment forming two separate and independent channels which feed the oscilloscope. One is termed the "vertical" channel because it controls the vertical set of deflection plates in the cathode ray tube, while the other is termed the "horizontal" channel because it controls the horizontal set of deflecting plates.

The unit which contains the sixteen separate bridge circuits is provided with suitable switches so that the output from any one of the pick-ups may be fed into either of the amplifier channels. In addition to the selective operation of any pick-up unit into either channel, the switching facilities also make it possible to secure the following results by direct observation:

(a) Determine the vector sum of two or more pick-up accelerations directly combined and fed into one or the other of the amplifier channels.

(b) Under (a) above, the phase of any of the pick-up outputs may be changed by 180° so that the vector differences are obtained.

(c) By using both amplifier channels simultaneously, the phase relationship between any two pick-up accelerations, of the same frequency, may be determined.

(d) The methods of (a) or (b) above may be combined with (c) to determine the phase relationship existing between the vector combination of acceleration expressed by one group of pick-ups and the output from a separate single pick-up or from a group of pick-ups.

As described above, the two output circuits of the bridge and switching mechanism are connected to the horizontal and vertical high frequency amplifiers. The high frequency designation is used because the voltages to be amplified are all at carrier frequency, or, to be exact, they occupy the band between the carrier frequency plus vibration frequency, and carrier frequency minus vibration frequency. This, as will be explained later, permits important simplifications and economies in the construction of the amplifier.

Each of these amplifiers contains two gain stages which build up the voltages, followed by a power output stage of amplification. The power output stage is intended to operate an electromagnetic oscillograph to obtain vibration records on film if desired. These records would be somewhat unconventional in appearance because of the presence of the carrier frequency. The film speed would be adjusted to a value which would bring out the shape of the vibration phenomena. Since these phenomena are of relatively low frequency as compared to the carrier, it follows that the film movement would be too slow to resolve the transverse motions of the light beam at carrier frequency into separate traces on the film. Therefore a solid or block pattern would result. The fixed amount of unbalance in the pick-up bridge circuit would lead to an oscillograph input of carrier frequency current having a constant maximum value. This would produce a solid block trace on the film of constant amplitude or height. If the amount of unbalance in the bridge circuit is varied by the pick-up in response to imposed mechanical acceleration, the amplitude of the block trace will be varied as the film moves along so that the profile of the trace will show the mechanical acceleration.

In addition to the provision for obtaining photographic records from an oscillograph, the apparatus permits the obtaining of immediate visual indications of the accelerations expressed by the pick-up units. Such visual indications are of the greatest importance in making flutter tests of aircraft where the information is needed before time can be taken to develop film from the oscillograph. Two kinds of visual indicators are used as shown in Fig. 1. One is a conventional oscilloscope known conventionally as a "cathode ray oscilloscope," and the other is a "D'Arsonval" indicating instrument which comprises a D. C. microammeter connected to a special circuit in such a way that its indications are approximately proportional to the average accelerations, or "g" which is being imposed on the connected pick-up unit. Accordingly, this latter instrument is termed a "G-meter" as legended upon Fig. 1. In Fig. 1, a selector switch labeled "G-switch" is used to connect the G-meter to either the horizontal or vertical channel.

Fig. 1 further shows a demodulator, filter, and low frequency amplifier interposed between each high frequency amplifier and the deflecting plates of the cathode ray tube in the oscilloscope. In the demodulator, the carrier frequency is suppressed and the modulation components representing the original mechanical vibrations are passed on to the filter. Demodulation serves two purposes: (a) It leads to a single line pattern on the oscilloscope rather than a block pattern of the type disclosed in connection with the electromagnetic oscillograph; and (b), demodulation also permits the use of a filter.

The output of the demodulator contains the electrical representation of all the mechanical accelerations falling within the range, and directed along the sensitive axis of the particular pick-up being analyzed. These accelerations may be so numerous and of such widely different frequencies that a simultaneous viewing of them all on the oscilloscope screen would be very confusing. For example, in making flutter measurements in an aircraft, the presence of high frequency accelerations due to engines, for example, would be superfluous and objectionable. The filter is therefore included. This unit readily passes on the low frequency phenomena which are important in making a flutter investigation, but the high frequency phenomena are so strongly attenuated that they are rendered negligible. The filter thus described and as used is a low pass filter. However, a high pass filter, or a band rejection filter could be used as well. A high pass filter would be appropriate if it were desired to eliminate indications due to low frequency phenomena and to focus attention on high frequency phenomena. A band pass filter has both an upper and a lower frequency limit, making it possible to concentrate attention on the phenomena occurring when frequencies lie between the upper and lower limits of the band pass filter, high and lower frequencies outside the limits of the filter being suppressed. The band rejection filter is exactly the converse of the band pass filter as it has both high and low frequency limits, and frequencies falling within these limits are suppressed, while all other frequencies are passed.

The output of the filter goes through a low frequency amplifier before being applied to the deflecting plates of the oscilloscope. This low frequency amplifier is used to obtain a voltage sufficient to operate the oscilloscope properly without the necessity of working with excessively high voltages in the demodulator and filter units. However, the gain in the low frequency amplifier is held to the necessary minimum because of the difficulty of extending the region of uniform gain into the region of low vibration frequencies which the equipment is intended to cover. Amplification without discrimination against the extremely low frequencies, in the range of 60 to 600 cycles per minute is readily accomplished in the high frequency amplifier, but after the demodulator has removed the carrier frequency, any further amplification must cover the entire range of the mechanical vibration frequencies which the equipment is being used to measure. Because of this necessity for covering a range of frequencies which includes very low frequencies, it follows that for a given amount of amplification, a low frequency amplifier would be more expensive and also more bulky than a high frequency amplifier for the modulated carrier current which would give an equal amount of gain.

The oscilloscope unit is of the conventional type and is equipped with a variable frequency saw-tooth oscillator which can be switched onto the horizontal deflecting plates of the cathode ray tube to provide a means of obtaining a stationary trace on the projection screen of the oscilloscope. This can be done only for recurrent phenomena, and the necessary condition for a stationary trace is that the saw-tooth oscillator be adjusted to the same frequency as that of the phenomena which are affecting the vertical deflecting plates of the cathode ray tube. This effect is used as a means of evaluating the frequency of the observed phenomena. The frequency control of the saw tooth oscillator is calibrated in terms of cycles per minute so that as soon as it has been adjusted to obtain a stationary trace on the screen, observation of the control setting gives a direct reading of the frequency.

In addition, the oscilloscope is equipped with two built-in amplifiers, each of which is provided with a gain control so that the amplification factor may be varied from zero to maximum. One of these amplifiers operates in the vertical channel and the other in the horizontal channel. This is a conventional arrangement in standard oscilloscopes, but in the instant apparatus the arrangement is special in that the amplifiers are designed to operate at very low frequencies. Furthermore, these amplifiers may be cut out of the circuit so that a direct connection from the low frequency amplifier to the deflection plates of the cathode ray tube may be obtained. This does away with any low frequency limitation to the oscilloscope amplifiers. However, for normal operation, their low frequency characteristic is satisfactory, and in normal operation these amplifiers are used. This oscilloscope has been further modified from standard or conventional by the addition of two large accurately graduated dials used for the vertical gain control and for the frequency control of the saw-tooth oscillator.

In addition to these principal items of the apparatus which have just been described, certain auxiliary items are indicated in Fig. 1. First of these is the oscillator which operates the carrier frequency current used to energize the bridge circuits into which the pick-up units are connected. This unit requires a source of electric power for its operation as well as do the amplifiers and demodulator units. As the apparatus is primarily intended for use in an aircraft while the aircraft is in flight, arrangements are made for the supply of all necessary power from storage batteries which may or may not be connected to the generators and electrical system of the aircraft. The power supply is therefore continuous current at 12 volts. 24 volts may be used as will be later explained in the description of the oscillator and power supply units.

In order to provide the high voltage continuous current required by the amplifiers, one of the auxiliary units is necessarily the power supply unit indicated in Fig. 1. This unit contains the dynamomotors used to secure the high voltage, and the filter equipment for the purpose of removing the ripple voltages produced by commutation. The oscillator and power supply are operated from a common battery which therefore supplies all the equipment except the oscilloscope and the oscillograph.

In the use of a conventional oscilloscope with the apparatus, A. C. at 110 volts, 60 cycles must be supplied. As shown in Fig. 1, a vibrator power supply is connected to the battery feeding the oscilloscope and oscillograph. This vibrator power supply is also a commercial and conventional piece of equipment and is used to convert low voltage D. C. battery power into 110 volts, 60 cycles A. C. Of course the electrical system of the aircraft may be substituted for the battery. Use of this second battery helps to reduce the drain on the battery feeding the oscillator and power supply previously described, and also prevents disturbances associated with the vibrator from affecting the oscillator and amplifiers. This battery can also be used for operating the electromagnetic oscillograph.

In Figs. 2 to 7, the structure of the pick-up unit is shown. A non-magnetic casing 2 encloses the operating mechanism, said case having a base 4 which is adapted to be bolted, or screwed, to a member the vibrations of which are to be studied. From a protecting cap 6 bolted at 8 to casing 2, tube 10 extends and forms a protective conduit for cable 12 which is composed of three insulated wires 70, 72, and 74, surrounded by a wire braid 14, Fig. 4, over which lies another insulating coat 16. Clip 13 holds cable 12 against movement within tube 10. The wire braid shields the cable against any inductances which could influence the electrical currents passing from the pick-up device to the switching apparatus. Each pick-up is located at a different position in an aircraft to be tested. The wires in cable 12 are joined to connecting leads which extend to the switching mechanism placed in a central location as in the cabin of an aircraft. When cable 12 is connected to the leads to the switching mechanism, a slidable shield 18 consisting of metallic braid is slid over the joint, thus shielding the joint against outside influences. After the pick-up has been installed, the metallic braid 14 is grounded to the structure being tested, thus increasing the effectiveness of the shield.

The details of the pick-up are more fully described in Figs. 5, 6 and 7. In Fig. 5, a ring-shaped ferrous mass 20 having the form of an I in cross-section, has a circular metallic disc 22 fitted to each side thereof. This mass lies inwardly of brass ring 24. The open ends of ring 24 are closed by copper beryllium spring discs 26, against which the central portion 28 of mass 20 bears. Secured to mass 20 on the outer faces of the discs 26 are second metallic masses 30 which function as poles. These poles are secured to the central mass by a pin 32. Second brass rings 36 lie above and below the central ring 24, and clamp the peripheries of discs 26 between rings 24 and 36. Rings 36 have inwardly directed flanges 38. Phenol fibre spools 40, on which are wound coils 42 are held against flanges 38 by plates 44 and 46 which cover the top and bottom of this assembly, these plates being clamped together by bolts 48 placed outwardly of rings 24 and 36. Plates 44 and 46, respectively, carry poles 50 threaded into projections 51 on the plates, poles 50 being adjustable to or from masses 30. Mass 20 lies within the flux field of coils 42. Poles 50, after being adjusted, are locked in position by screws 52. Plate 44 is of sufficient diameter to extend to the outer edge of a securing flange 53 surrounding casing 2 whereby the plate is secured to casing 2 by bolts 8 which also secure the cap 6 to casing 2. Between plate 44 and cap 6 is located an insulating member 54 which supports binding posts 56. Leads 57 from coils 42 are secured to these binding posts.

Ring 24 is drilled at 60, and 36 is drilled at 62 to provide fluid passages. After the device is assembled, it is evacuated and filled with a non-compressible fluid with a nearly constant viscosity over the operating temperature range by a convenient means as through a plug in the wall of casing 2, not shown. As more clearly shown in Fig. 6, spring discs 26 are slightly deflected from their normal position by the central portion 28 of mass 20. That is, the discs are constructed as being flat, but in assembling the pick-up, the central portion of the discs is deflected approximately 0.002 inch. This initial straining of the discs is considered important. As the portion 28 of mass 20 moves in response to accelerations, an inaccurate response to vibrations of low magnitude would occur if both discs passed through their central flat position at the same time, and this would be particularly true for accelerations of low magnitude. By initially placing discs 26 under tension, and concave toward each other, the two discs never pass through their center, neutral, or flat position at the same time, inasmuch as the mass 20 must deflect several thousandths of an inch before either disc can pass through a flat condition.

The operation of the pick-up device to measure accelerations is as follows:

An alternating current functioning as a carrier current is supplied from the oscillator diagrammatically indicated in Fig. 1 to coils 42, which are connected in series opposition through leads 58 to cable 12. Before final assembly of the unit, pole pieces 50 are adjusted and locked in place in order to set the proper air gap between them and poles 30, this setting the amount of inductance that can be obtained in coils 42. As a mass 30 approaches an adjacent pole 50 on one side of mass 20, the corresponding poles on the opposite side of the mass become further apart. Changes in the respective air gaps between adjacent masses 30 and poles 50 cause a change in the reluctance of a magnetic circuit existing between the coils 42 and the mass 20, and a corresponding change in the inductance of each of the two coils.

The inductive resistance of any coil is equal to the product of its inductance by $2\pi$ times the frequency of the alternating voltage applied. The inductance is proportional to the amount of flux produced by a given current in the magnetic circuit associated with the particular coil, and this flux in turn is inversely proportional to the reluctance of the magnetic circuit. Therefore it is apparent that the motion of the inductor relative to the frame (in response to acceleration imposed on the pick-up) results in changes in the inductance and reactance of both the upper and lower coils. These changes occur in such a manner that as one coil has its reactance increased by the approach of the inductor, the other coil is experiencing a decrease in inductance (and reactance) due to the increasing separation from the inductor.

The provision for adjustment of the pole pieces serves two purposes. First it provides a means of making the reactances of the two coils equal. This is of considerable importance in securing a 1:1 balanced bridge circuit for convenience in switching and combining indications as will be discussed later. Secondly, the pole piece adjustment provides a means of varying the sensitivity. The maximum pick-up sensitivity occurs for a small gap separation, but when the pick-up is to be subjected to large values of acceleration which would produce correspondingly large values of inductor displacement it is necessary to increase the gap separation in order to avoid actual striking of the pole pieces.

Thus, an alternating modulation of the carrier frequency primarily supplied to the coils 42 is produced. After adjustment, the assembly is completed, dampening fluid placed in the unit, and the unit is then secured to a structural part whose vibratory motions are to be studied. Movement of the structural part creates movement in the unit because of the inertia of mass 20. This movement of mass 20 is damped by the flow of the fluid which must pass through ports 60 and 62, respectively, as the spring discs 26 are deflected.

The use of two diaphragm springs 26 with precisely fixed radial location is very important because it very effectively provides selective response. That is, the only motion possible between the inductor and the surrounding frame is pure axial displacement. Therefore, of all the random accelerations which may be imposed on the pickup, only those components of acceleration which are directed along the axis of the unit will be effective in producing motion of the inductor and response of the entire equipment. It is obvious that this property of selective response is indispensable in making any analysis of an unknown and complex motion.

The use of the fluid not only prevents excessive amplitudes of movement of the mass, but prevents the inductor system from vibrating at its natural resonant frequency in response to any random or shock excitation which may be imposed upon the pick-up. Again, large amplitudes of spring deflection are eliminated which would lead to the failure of the springs from fatigue.

The range of frequencies over which the inductor type pick-up has been experimentally used extends from about 30 cycles per minute up to approximately 4500 cycles per minute. These figures, however, do not constitute either an upper or lower limit of usefulness. The inductor pick-up is designed to operate as an accelerometer; that is, the displacement of the inductor relative to the frame of the pick-up is designed to be proportional to the acceleration which is imposed on the pick-up as a unit.

Deviations from this "ideal" characteristic become more and more pronounced as the frequency of the imposed mechanical vibration is increased from zero frequency toward the natural resonant frequency of the inductor, (or moving mass which is supported on a system of springs within the pick-up).

Theory indicates however that the use of "viscous" damping amounting to 62% of the critical value will result in a deviation from the "ideal" characteristic of less than ±3% for any frequency within the range from zero to 75% of the natural resonant frequency of the inductor system. The upper frequency limit of pick-up usefulness is therefore related to the natural resonant frequency of the inductor system. For the pick-up units actually in use, this natural frequency was designed to be 12,000 cycles per minute. In principle the upper limit can be extended almost indefinitely by the use of stiff springs and a small mass. On this basis the theoretical ultimate upper frequency limit of pick-up usefulness should not be less than 1,000,000 cycles per minute. On the other extreme there is no theoretical lower limit of frequency response for the accelerometer.

However, because of the fact that the sensitivity of an accelerometer varies inversely as the square of the natural frequency, this consideration of sensitivity usually sets a practical upper limit for the natural frequency of the moving system (i. e., the inductor system in the case of the subject pick-up). Considering only the response to accelerations, of the pick-up unit per se, practice coincides with theory and there is no low frequency limitation. However, because of the electrical amplifiers used in the present equipment, the entire arrangement of equipment does begin to lose sensitivity at frequencies lower than 60 per minute although good response is available even down to, and somewhat below 30 per minute.

The preceding discussion of sensitivity is on the basis of response to acceleration. In normal usage these accelerations will be produced by periodic displacements (of the structure or part to which the pick-up is attached) from a neutral or "at rest" position. In this connection, since the maximum value of acceleration associated with a sinusoidal motion is proportional to the product of the maximum amplitude of displacement and the square of the frequency it follows that the sensitivity of even an "ideal" accelerometer device to periodic displacements is inversely proportional to the square of the frequency. Hence, if the "useful range of frequency" for the subject pick-up and equipment is discussed from the standpoint of possessing sufficient sensitivity to give a useful response, a great deal will depend upon whether sensitivity to displacement is intended, or sensitivity to acceleration. In principle the response of the entire equipment to acceleration can be made essentially uniform over a frequency range extending from any low frequency other than zero up to at least 1,000,000 cycles per minute. However, due to the inherent characteristics of even an "ideal" accelerometer, the response as related to periodic displacements will be very great at high frequency decreasing to zero to zero frequency.

There is another factor, which is very elementary, but absolutely basic in any practical discussion of the useful range covered by the pick-up and apparatus. The apparatus will be useful in observing and measuring a given vibration only when the frequency lies within the working range, and also when the magnitude of the accelerations associated with the vibration is sufficient to produce a proper response of the apparatus, without being so great as to damage the apparatus. This question of combining sufficient sensitivity with adequate ruggedness is of more practical than theoretical importance. In point of fact, the apparatus is so rugged that pick-up units tested under severe vibration amounting to over 100 times the acceleration of gravity were undamaged. At the same time sensitivity is such that 0.02 times the acceleration of gravity is sufficient to give usable indications.

Fig. 8 illustrates the wiring system for the bridge circuits and switches shown in Fig. 1. A transformer 76, which is in the output circuit of the oscillator, Fig. 1, and which is supplied with current in a manner to be described below, in connection with Fig. 12, represents the source of carrier frequency current to the bridge circuit. The exact value of carrier frequency voltage applied to the bridge circuit is important because the output voltage of the bridge is proportional to the product of the input voltage and the degree of unbalance present in the bridge. Therefore, two potentiometers marked Co for coarse and Fi for fine are shown in Fig. 8 connected to leads 77a and 77b from the transformer 76. These two potentiometers enable accurate adjustment to be made, while the volt meter 78 gives the actual value of the voltage applied. Leads 77a and 77b, the Co and Fi potentiometers, and volt meter 78 are common to all pick-up units $A^1$ to $A^{16}$, inclusive, Fig. 1. Individual circuits for but two units are shown for purposes of example in Fig. 8.

A switch 80 connects the bridge circuit for one pick-up unit, for example unit $A^1$ of Fig. 1, to leads 77a and 77b, and makes or breaks contact between the bridge circuit and the oscillator voltage. Switch 82 is a reversing switch for altering the phase of the carrier input by 180°. Switch 84 is a double pole, double throw, center off, three position switch connecting the bridge to transformer 86, composed of parts 86a and 86b. Thus the switch connects the output of the bridge through leads 85a to the vertical channel high frequency amplifier through transformer 86a, or to the horizontal channel through leads 85b and transformer 86b, or isolates the bridge output from both channels.

The bridge proper has two ratio arms with a single common adjustment constituting the potentiometer 88. Fixed resistors 90 and 92 comprise a large percentage of the resistances in each arm to make the resistance in each arm constant, and thereby reduce the delicacy of the adjustment required in the potentiometer 88 in order to secure a balance of the circuit. An individual pick-up is represented by two inductances such as 95 and 97 which form the principal parts of the two variable arms. These inductances are, of course, the two coils 42 built into the pick-up 2, and connected to the bridge circuit through the leads 70, 72 and 74.

The movable pole pieces described in connection with the pick-up unit 2 are adjusted so that the inductance of the lower coil exactly matches that of the upper coil when the pick-up unit is at rest. Subsequently in balancing the bridge circuit, the potentiometer 88 is adjusted so that the 1:1 inductance balance in the pick-up is matched by a 1:1 resistance balance of the ratio arms. This condition is termed a "magnitude balance" of the bridge circuit but does not represent a completely balanced condition which would correspond to a no voltage output regardless of the amount of input voltage applied. The remaining balance condition is termed "phase balance." The two balance requirements, "magnitude" and "phase," arise from the fact that the pick-up coils function in the electric circuit both as inductances and pure resistances, and neither solely as a pure inductance or a pure resistance. The inductance effect is due to the magnetic flux which links each coil 42, and the resistance effect is due partly to the ohmic resistance of the copper wire used in the windings and leads, and partly to the losses which arise from the reversals, or alternations of the magnetic flux occurring in response to the alternating current applied to the bridge circuit.

The inductive and magnetic circuits used for both upper and lower coils in each pick-up 2 are made as nearly identical as possible. In fact, the magnetic circuits are adjusted by means of the movable pole pieces 50 so that the inductances of the coil are identical. No means, however, is built into the pick-up unit for making the loss or resistance effects of the two coils absolutely identical. Such is accomplished by means of a variable resistor or phase balance control 94 which is in series with one of the two pick-up coils. By experiment the proper connections of the pick-ups are determined so that this phase balance control 94 will be in series with the coil of the pick-up having the smaller effective resistance. The resistance introduced at 94 is adjusted until it is just sufficient to make up the deficiency existing in the low resistance coil. Thus by means of two adjustments, the pick-up coils are simultaneously brought into a 1:1 relationship with each other, and both their phase or resistance components and their magnitude or inductance components are made identical to produce a complete balance of the bridge circuit with the corresponding adjustment of the ratio arms into a 1:1 relationship.

This balance condition holds only so long as the pick-up unit is at rest. As soon as the pick-up unit experiences an acceleration which moves the inductor mass 20, the balance between the coils is disturbed and their inductance and therefore their reactance are no longer the same. Consequently, a voltage difference appears between the midpoint of potentiometer 88 and common lead 72 of the two coils. This voltage is applied to the resistors 96 and 98 connected in series. Resistors 96 and 98 constitute, in effect, a potentiometer, and the voltage across resistor 96 is applied through switch 84 to transformers 86a or 86b which feed the high frequency amplifiers. By adjusting resistor 98 to zero resistance the total amount of unbalance voltage is applied to transformer 86, but when each resistor 98 may be adjusted to its maximum value which just equals the resistance of resistor 96, transformer 86 receives only half of the unbalance voltage which is developed. Hence resistor 98 serves as a "sensitivity control" for varying the bridge output for a given acceleration over a range of 2:1.

The bridge circuit for a single pick-up 2 has just been described. In Fig. 8 the bridge circuit for a second similar pick-up is also shown. It is identical with that for the first circuit just described and the corresponding elements have like reference characters with the subscript a. Leads 77a and 77b from the transformer 76 are common to the bridge circuits for each individual pick-up. An apparatus which has been actually used has contained a total of sixteen pick-ups and associated bridge circuits. Of course, the number of pick-up units with their corresponding bridge circuits may be varied without limit. As the description of one bridge circuit serves for any number of identical bridge circuits, no further bridge circuits are described. It is noted, however, that the proximity of the various components of a plurality of circuits, as well as of the wires, would provide capacity coupling between the circuits and lead to objectional interaction therebetween if very thorough shielding were not employed. Consequently, metal panels and boxes are used to house the apparatus, and the components of each individual bridge circuit are grouped as compactly as possible and are surrounded by metallic shields from adjacent circuits. Shielded lead wires, connection with metallic bodies, blocks, and connection cable with metallic shield braid, also contribute to the thorough isolation of the individual circuits.

All of the above mentioned shields are grounded to the metal boxes housing the equipment, all of which are connected together, and, of course, each and every component and wire comprising a bridge circuit has capacity to ground. These capacities are unavoidable, but nevertheless they represent parasitic and undesirable effects. However, these effects are made negligible by the inclusion in the circuit of a so-called Wagner ground. This grounding device is composed of two resistances 100, 102 connected across leads 77a and 77b near the volt meter 78, and grounded at 104. These resistances are made equal to each other and are of low impedance as compared to the various arms of the bridge circuits. Because all bridge circuits are balanced to a 1:1 condition, this single Wagner ground is also adjusted to a 1:1 relationship and is thus able to serve all bridge circuits.

This Wagner ground eliminates undesirable effects due to grounding in the following manner: With a given pickup unit at rest and its bridge circuit balanced, the potential of the mid-point of the potentiometer 88 is the same as the potential of the lead-in 72, because each of these two points is at a potential midway between that of the two wires leading from switch 82. Another point which occupies a similar mid-position and therefore is at the same potential, is the point midway between the Wagner ground arms 100, 102. But, this point is actually grounded and hence the two other mid-points which are at this same potential are also at ground potential, although they are not actually grounded. Since these two balance points of the bridge are each at ground potential, it follows that capacity to ground for either of these points will produce no parasitic currents since no voltage is acting. This is very important from the standpoint of eliminating difficulty due to the capacity which exists within the pick-up connection cable between the ground shield and lead 72. Capacity to ground from other points of the bridge circuit can, in general be visualized as acting in parallel with one or the other of the Wagner ground arms 100, 102. Since all stray ground capacities are actually of small magnitude, it follows that their impedances are very high and therefore have negligible effect on the total impedance when considered as operating in parallel with a low impedance circuit member such as 100, 102.

How various pick-up units can be combined by the switching arrangements shown, for the purpose of analyzing various vibrations, is now described. As previously stated, it is possible to accomplish vector addition, vector subtraction, and to establish phase relationship of the mechanical accelerations to which two or more of the pick-up units are responding. Vector addition of the accelerations to which the two pick-ups corresponding to the bridge circuits in Fig. 8 are responding, can be made by closing switches 80 and 80a and also closing switches 82 and 82a, both switches being closed in the same direction. Switches 84 and 84a would each be connected to leads 85b for the horizontal channel, or, if desired, to leads 85a for the vertical channel; that is, to either transformer 86b or 86a. The effect of this switching combination is to form what amounts to a single bridge circuit out of the two individual circuits. Each arm or member of the resultant bridge is formed by the parallel combination of the corresponding members of the two individual bridges. Thus, resistor 96a is directly in parallel with 96 while the ratio arms are also parallel directly. The combination of resistors and inductance 94, 95 and 98 is parallel with the combination of resistors and inductances 94a, 95a and 98a.

The mathematical equations which describe the output of this combination in terms of the accelerations imposed on the two pick-up units shown are complicated, but the net result is identical with that obtained for the description of the carbon pile pick-up in application Serial No. 214,562, in which the carbon pile pick-up had a bridge circuit similar to a simple Wheatstone net operating on continuous current from a battery, rather than on alternating current operating from an oscillator. This result briefly means that the electrical output of the combination bridge circuit is equivalent to that which would be obtained from a single pick-up unit and bridge circuit if the single unit were subjected to one-half of the vector sum of the accelerations being imposed on the two pick-up units of the combination.

The vector form of the accelerations which is mentioned above must be understood as referring to accelerations which are associated with periodic motions and which are therefore themselves periodic. Such a quantity is similar to an alternating current or voltage, and may, in a similar manner, be represented by a vector which possesses an effective value such as a magnitude, and which also acts with a certain time or phase displacement when referred to a time reference standard. Therefore, in speaking of the vector sum of two such accelerations, it is clear that the direction part of each vector is actually a time phase, and does not refer to the physical direction or orientation in space along which the accelerations are acting. It is recognized that instantaneous values of accelerations acting with a given orientation in space are vectors, but the vector combination accomplished by the instant invention is concerned with time phase, and not with space orientation. This does not mean that the space orientation is indefinite or indeterminate as far as the apparatus of this invention is concerned. There is no ambiguity, because the basic mechanical system of the pick-up units is selective in its response, and only those accelerations which are directed along the axis of the pick-up are effective in producing any electrical response in the equipment. In view of the above, it is clear that a vector combination accomplished by this apparatus is significant only when the accelerations combined are both periodic and both of the same frequency, because it is only when the frequencies coincide that there is any meaning attached to the conception of a time phase displacement existing between two vectors representing periodic accelerations.

With this understanding of the terms used, the possibility for use of vector combinations by the apparatus will be discussed. Referring to the previous description of the switching combination required in order to obtain the vector addition, it will be noted that the essential conditions for vector additions are:

(a) Both switches 80 closed;
(b) Both switches 82 closed in the same direction;
(c) Both switches 84 and 84a closed to make connection to the same high frequency amplifier of either the horizontal or vertical channel.

It is to be noted that the output of this combination is one-half of the vector sum directly. Furthermore, the method is general, and, if desired, the vector sum of accelerations applied to all the pick-ups could be obtained. When such is desired, all the switches are closed as set forth above. The output of this combination will be the vector sum of the several accelerations to which the individual pick-up units are responding, divided by the number of pick-up units entering into the combination. The fact that the sum is always divided by the number of pick-ups is an inherent characteristic of this method of switching, and means that basically the action is that of averaging. Thus, if the accelerations entering into a given result are all in phase, the vector sum becomes a simple arithmetic sum, and the act of dividing between the number of units in use means that the result is the average of the individual accelerations.

Vector subtraction is, of course, only a special case of vector addition. Subtraction implies that the sense of the vector is reversed, for example, its phase is shifted by 180°. This is readily accomplished by use of the switches 82 and 82a, which reverse the phase of the input or carrier frequency voltage to the bridge circuit. Phase reversal of the input voltage results in a reversal or a 180° phase shift of the bridge output voltage. The switching arrangement for subtraction of the pick-up unit connected through switch 80a, and the pick-up unit connected by switch 80, is as follows:

(a) Switches 80 and 80a closed;
(b) Switch 82 closed in one direction, and switch 82a closed in an opposite direction;
(c) Switches 84 and 84a closed in the same direction.

The resulting output of this combination will be one-half the vector difference; that is, one-half the vector sum of one pick-up response added to the response of the second pick-up taken after a phase shift of 180°. Actually, the resulting output would be essentially the same if under (b) above, the positions of both switches 82 and 82a were reversed. The essential point is that the switches 82 and 82a are all closed in the same direction for addition, while they are closed in opposite directions for subtraction. Just as for addition, the output consists of the vector result divided by the total number of pick-up units connected to the particular amplifier channel.

An example of a practical use of the adding and subtracting features of the equipment is given in separating the bending and torsion modes of vibration in an airplane wing, or tail surface. Two pick-up units are attached to the structure of the wing, both at the same distance out from the center line of the airplane. One unit is located forward of the elastic axis, and the other aft of this axis. The elastic axis is by definition the axis about which torsion takes place, hence the axis itself offers no deflection due to torsion. That is, the motion at this point in the wing cross-section would therefore consist solely of pure bending motion. Both pick-up units are similarly oriented with their sensitive axes directed to respond to motion due to wing bending. With the two pick-up circuits connected to the vertical channel and combined for subtraction, the resulting trace on the oscilloscope screen is used to find the vibration frequency, and the height of the trace on the screen interpreted in terms of the calibration of the apparatus indicates one-half of the acceleration due to torsion.

The accelerations due to bending would be the same at each pick-up unit and the subtraction arrangement therefore cancels these accelerations. When using the accelerometer characteristic of the pick-up, the actual difference in pick-up motions for the two units is given by the accelerations as found from the oscilloscope divided by one-half the square of the frequency; this one-half factor being introduced to cancel the one-half arising from the subtraction characteristics of the equipment. This quotient, giving the difference in the linear motion in the two pick-up units due to torsion, is further divided between linear distance by which the pick-ups are separated in their attachment to the wing structure, and the resulting quotient gives the angle to wing torsion in radians.

The determination of the pure bending motion can also be ascertained if the position of the elastic axis is known, so that the pick-up units can be located at equal distances from it; one being forward of the axis and the other being aft. If this condition is met, then the pick-up circuits are connected for addition, with the result being the average of the two accelerations, which represents that of the mid-point of the line connecting the two pick-ups, that is, the acceleration occurring at the elastic axis. This point by definition does not partake of any torsional motion, and hence the resulting trace on the oscilloscope is the result of accelerations due to pure bending. Determination of the frequency and reference to the equipment calibration therefore, permit determination and evaluation of the wing motion occurring at the span location of the pick-up, that is, at its distance from the center line of the airplane.

In the entire foregoing discussion of vector addition and subtraction combinations for two or more pick-up units, equal sensitivity has been assumed for all the units and bridge circuits entering into the combination. This condition is most important, in fact, it is absolutely essential to the successful use of the vector combination feature. All bridge circuits and pick-up units are made as nearly identical as possible. In this connection the adjustable pole pieces of the pick-up units are very important. However, in spite of careful construction, some difference may be found in the response of two bridge circuits even when their pick-up units are subjected to the same acceleration. This condition is compensated, however, by proper adjustment of the resistors 98 and 98a, Fig. 8, which are included in each bridge circuit. These resistors in combination with the unadjustable resistors 96 and 96a form a potentiometer by which the output of each bridge may be adjusted without alteration in the phase of the output voltage. Thus the overall sensitivity of each pick-up unit and bridge circuit may be adjusted so that all sensitivities are matched.

In addition to the use of the equipment for vector addition and subtraction, it is also used to determine the phase relationship between two periodic vibrations having the same frequency. Thus if two pick-up units are attached to different portions of a structure which is vibrating at a given frequency, the following operation of the switches would be used to obtain an indication of the phase relationship:

(a) Switches 80 and 80a closed;
(b) Switches 82 and 82a closed in the same direction;
(c) Switch 84 closed to make contact with the vertical channel, and switch 84a closed to make contact with the horizontal channel.

The spot on the oscilloscope screen will trace a pattern in which the vertical components of motion represent acceleration imposed on the first pick-up through switch 84 while the horizontal components of the motion are due to accelerations imposed on the second pick-up through switch 84a. For recurring periodic vibrations, the trace on the screen will be a closed stationary figure. If the vibration is all taking place at a single frequency, the figure on the screen will be some form of an ellipse. For zero and 180 degree phase displacements, the ellipse degenerates into a straight line, which will lie in the first and third quadrants for zero degrees, and in the second and fourth quadrants for 180 degree displacement. For 90 and 270 degree displacements, the ellipse becomes a circle, provided also that the maximum horizontal and vertical amplitudes on the screen are equal. Whether or not this condition is met, the phase relationship may be deduced by a skilled operator from observations on the oscilloscope screen as to the shape, orientation, and magnitude of the ellipse.

In connection with the switch position used to secure phase patterns, it will be noted from (b) above, that the switches 82 and 82a may be closed in either position. It might be thought that by reversing the position of switch 82 without a change of switch 82a, a phase change of 180° would be produced. This is not true. Reversal of switch 82 does not change the phase of the bridge output voltage of the phase pick-up by 180°, but this applies only to the carrier frequency. After passing through demodulation, the carrier is no longer present and consequently its phase has no effect on the voltage applied to the oscilloscope. In the case of addition and subtraction, voltages and current are combined before demodulation and carrier frequency phase relationships are significant, but in the case of phase determination, the two voltages to be compared are combined at the oscilloscope after demodulation, and hence the position of switches 82 and 82a which effect only the phase of the carrier frequency currents and voltages have no bearing on the final result.

A practical example of the use of phase determination exists in the determination of the phase relationship between the bending and torsional modes of vibration in an airplane wing. This phase angle is of importance in flutter vibration testing, and can be conveniently found as follows: Three pick-up units are attached to the wing structure at equal distances from the center line of the airplane, and all three will be oriented to respond to bending motion. The third unit is located as close as possible to the elastic axis of the wing so that its acceleration is in response to bending with negligible effect from torsion. The first two units are separated sufficiently to make their vector subtraction output a good measure of wing torsion. The output voltage from the bridge circuits of the first two units is fed to either the horizontal or the vertical channel, while the output voltage from the third bridge circuit from the third unit representing bending motion is fed into the other channel. A switching combination to secure this result is as follows:

(a) Switches 80, 82a, etc., are closed;
(b) Switch 82 closed in position X; switch 82a in position Y, and the corresponding switch for the third pick-up unit is closed in either the X or Y position;
(c) Switches 84 and 84a connected to the horizontal channel, and the switch for the third pick-up unit connected to the vertical channel.

Interpretation of the resulting figure on the oscilloscope screen will give the required phase relationship existing between the bending and torsional modes of the wing vibrations.

The above illustrates the flexibility of the switching mechanism in providing for the determination of the phase relationship between two coupled modes of vibration. In general, the phase relationship existing between two motions of the same frequency may be determined by the equipment, regardless of whether one pick-up unit or a group of pick-up units are required to detect each motion. The general switching instructions for determination of phase relationship are as follows:

(a) All switches 80, 80a, etc., closed for those pick-ups entering into the measurement;
(b) For all pick-up units whose effect is to be additive, switches 82, 82a, etc., are closed in position X; for all units intended to be subtractive, all switches 82, 82a, etc., are closed in position Y;
(c) For those pick-up units used in detecting one of the motions, switches 84, 84a, etc., are closed to the horizontal channel; while for the remaining pick-up units used in detecting the other motion, switches 84, 84a, etc., are closed to make contact with the vertical channel.

In connection with all the foregoing discussion of phase relationship, it must be recognized that the previous definitions apply, and phase refers entirely to the time relationship and not to the space orientation of the accelerations. The space orientation is completely determined by the selective response of the pick-up units which forces the orientation of the accelerations measured to coincide with the orientation of the pick-up units themselves. Furthermore, the phase relationship indicated by the equipment is always that existing between accelerations. For sinusoidal vibrations, the phase relationships existing between the amplitude, velocity, and accelerations are well known from elementary mechanics. Hence, after the phase relationship between the accelerations associated with two motions are determined by the equipment, all the other phase relationships are readily computed.

The output from the bridge and switching circuits is fed into either the transformer 86a for the vertical channel or the transformer 86b for the horizontal channel, after the circuits have been combined as just previously described. As shown in Fig. 1, the current passes from the bridge circuits and switches to a high frequency amplifier which is more particularly shown in the circuit diagram of Fig. 9, which is described for the vertical high frequency amplifier. From transformer 86a, the current is passed through two stages of resistance coupled amplification comprising the vacuum tubes 100T and 102T which function as the principal source of voltage gain. A transformer coupled push-pull stage embodying power amplifier vacuum tubes 104T and 106 is used as a source of power adequate to operate an electro-magnetic oscillograph. Since this amplifier operates on essentially constant frequency in the audio range, it presents no special problems. Design is such as to secure stable operation with essentially constant amplification over the operating ranges of supply voltages. The output transformer 108 is equipped with two output windings 110 and 112, respectively. The low impedance winding 112 is intended for connection to the electromagnetic oscillograph. The higher impedance winding 110 is connected to the "G" meter circuit more particularly shown in Fig. 11, and to the demodulator more particularly shown in Fig. 10. All power for operation of the vacuum tubes is supplied through a plug 114 connected to a flexible power cable. This is actually a portion of the single cable and plug which connects all vacuum tube units to the power supply unit of Fig. 1, and shown in detail in Fig. 12.

The circuit diagrams for the demodulator, filter, and low frequency amplifier units of the vertical channel are shown in Fig. 10. The input is from the secondary winding 110 of transformer 108 which is the output transformer of the vertical high frequency amplifier of Fig. 9. Connections to the input of the demodulator are made from leads 102 and 104, at 116 and 118, respectively. In addition, switch 120, which is the G switch of Fig. 1, is shown. It is used to connect the G meter to either the horizontal or vertical channel, and is shown more completely in Fig. 11, which is the G meter circuit diagram. It will be noted further that a resistor 122 is connected between the points 116, 118; this resistor being used to stabilize the circuit operation and to form a more constant load on the transformer 108. The object is to avoid changes in the sensitivity of the channel which would otherwise be caused by impedance changes due to switching the G meter from one channel to the other.

Vacuum tube 124 is a duplex tube functioning in two separate circuits; that is, the demodulator, and the low frequency amplifier, circuits. The tube is known technically as a "duplex diode, high mu triode, RCA No. 75." Functionally, two separate tubes could just as well be used, but for economy in space and power requirements the single tube is preferable. The two diode elements are connected together to form a half-wave rectifier which, in conjunction with the resistors 126 and 128, and capacitors 130 and 132, comprises the demodulator circuit. Because of the rectifier action, a voltage is developed across resistor 128 which is always of the same polarity, and has a magnitude which varies in response to the magnitude of the carrier frequency voltage supplied by transformer 108. Hence the variation in voltage across resistor 128 represents demodulation of the carrier and; that is, of the mechanical vibration. This voltage is applied to the triode element of tube 124 by means of conventional grid coupling circuit consisting of capacitor 134 and resistor 136. The filter element is inserted between resistor 136 and the grid of tube 124.

As previously stated, the function of the filter is to focus attention on the frequency range which contains the mechanical vibrations being investigated; other mechanical vibration frequencies being suppressed. The apparatus described is intended for investigation of flutter where the lower frequencies are of importance and high frequencies due to engine vibrations are extraneous. The filter is designed to pass all frequencies from zero up to the cut-off frequency. Above the cut-off frequency attenuation occurs to suppress all higher frequencies.

The filter is of conventional design and comprises a central prototype T section combined with "M-derived" terminating L sections used at both input and output ends. The "M-derived" L sections provide essentially constant input and output impedances for the filter over the operating range of frequencies. The series inductance of each L section has been combined with the adjacent inductance of the T section so that only four choke coils 140, 142, 144 and 146 are required in each channel. Six capacitors, 148, 150, 152, 154, 156, and 158 are used, three at a time; switches 160, 162 and 164 being provided to obtain the proper selection. With these switches set to capacitors 148, 152 and 156, switch 166 being open, the cut-off frequency is 600 cycles per minute; while with the switches set to the other capacitors; namely, 150, 154 and 158, the cut-off frequency is shifted to 120 cycles per minute. On the other hand, all attenuating action may be eliminated by placing switches 160, 162 and 164 in the open position while switch 166 is closed. Various filter characteristics may be obtained from the different combinations possible with the three switches 160, 162 and 164, but in all cases where filter action is desired, switch 166 will be open.

The output of the filter is applied to the grid of the triode section of tube 124. This section of the tube operates as a resistance capacity coupled amplifier working into the load resistance 168. The low frequency amplifier gives a voltage gain of approximately 50. Very little power output is required, since the connected load consists only of the oscilloscope which has an input impedance of 500,000 ohms. Connection to the oscilloscope is made through a plug 170 to a flexible oscilloscope cable. This cable is of the type employing a grounded metallic shield and is similar to the pick-up connection cables, except that two instead of three conductors are used. The circuit of the low frequency amplifier is conventional, but the values of resistors 136, 168 and 172, and capacitors 134, 174 and 176 have been specially designed with a view to maintaining the voltage amplification even at very low frequencies, 60 cycles per minute. This unit functions with diminishing amplification factor even down to less than 30 cycles per minute.

However, in common with all resistance capacity coupled amplifiers, the gain becomes zero at zero frequency; that is, at zero frequency nothing is passed by the amplifier. This is because of the capacity type of coupling; which for any finite value of the capacitor 134 offers infinite impedance to any zero frequency phenomena. Since the impedance of capacitor 134 varies widely over the frequency to be investigated, 60 to 1200 cycles per minute, that is, 20:1, it follows that for a given amount of amplification, the design, cost, and physical size of this amplifier are not so favorable as that of the high frequency amplifier where the frequency range amounts to less than 1.01:1.00. For this reason, the principal amount of gain is secured in the high frequency amplifier.

The power connections to this unit are made through the power connection cable 114 coming from the "power supply" of Fig. 1.

The circuit diagram for the G meter circuit is shown in Fig. 11. The function of this meter is to indicate the average value of the acceleration being imposed on a given pick-up unit. Transformers 108 and 180 represent the output transformer of the vertical and horizontal high frequency amplifiers, respectively. A resistor 189 is provided similar to resistor 122. Leads 182 and 184 from secondary winding 110, and leads 183 and 185 from secondary winding 181, are brought to a switch 120 which is a double pole, double throw, center-off position switch, and is the G switch of Fig. 1. This switch makes it possible to isolate the meter or to connect it to either of the amplifiers for the horizontal and vertical channels. The meter consists of a sensitive D. C. microammeter 187 which is the G meter of Fig. 1. A full wave rectifier unit 186 is used to convert the alternating current to continuous current to operate meter 187. An additional full wave rectifier 188, and a transformer 190 are also used to secure the desired type of meter response. Adjustable resistors 192, 194 and 196 are provided as a means for controlling the characteristics of the meter. All three resistors affect the sensitivity of the meter and, in addition, resistor 192 affects the damping. Since the microammeter is a permanent magnet, moving coil instrument, rotation of its moving system will generate a voltage in its coil and the resultant current flow develops torque that opposes the rotation which is generating the voltage. The amount of this current, and hence the damping torque developed, is controlled by resistor 192 which is called the "damping adjustment." If damping is small, the meter is free to move rapidly and shows the effect of transient disturbances by a "kick." If damping is heavy, the response of the meter becomes sluggish, and even when severe momentary transients are encountered, a stabilized meter reading of the average is obtained. Resistor 192 being set to give the desired value of damping, the overall sensitivity is then adjusted to the desired value by means of resistor 196, termed the "series sensitivity adjustment," and resistor 194, termed the "shunt sensitivity adjustment."

The circuit diagram for the oscillator used to supply the carrier frequency current to the bridge circuits of Figs. 1 and 8, is shown in Fig. 12. Vacuum tube 200 is an oscillator. The primary of the transformer 202 serves as a tuned resonant circuit. Switch 204 is termed the "coarse frequency control." It provides for three separate operating frequencies corresponding to the three values of capacity which it is used to select. No capacitor is connected to point 206 of switch 204; hence when the switch is at this setting, the distributed capacity of the transformer is the only capacity acting, and the oscillating frequency is a maximum. The adjustable resistor 208 is called the "fine frequency control," and it is used as a Vernier adjustment supplementing the selective action of switch 204. It functions by partially short-circuiting one-half of the secondary winding of transformer 202 to vary the effective inductance of the transformer primary. It also varies the voltage of the oscillator, but an independent voltage control is provided by the potentiometer 210 which determines the voltage output of the entire oscillator unit by controlling the bridge voltage applied to the buffer amplifier comprising the tube 212. Potentiometer 210 is called the "output control."

Buffer amplifier 212 is coupled by transformer 214 to the push-pull power output stage which employs two-beam power tubes 216 and 218, and is capable of delivering 32 watts of output power. Negative feed back is used to eliminate harmonic distortion, and thus to maintain the purity of the sine wave generated by the oscillator. Output transformer 220 is connected by a flexible cable (with grounded metallic shield) to leads 77a and 77b of the group of individual bridge circuits to operate all these individual bridge circuits simultaneously. The arrangements of the coarse and fine voltage controls (note Fig. 8) is such that these low resistance potentiometers constitute the principal load on the oscillator; the load of one, or even all of the individual bridge circuits, being small as compared to that of the potentiometers. This apparent waste of oscillator power is used to secure the following advantages:

(a) Essentially constant load on the oscillator creates stable operation and avoids changes in voltage when switching individual bridge circuits on and off.

(b) Low resistance connected across the inputs of the bridge circuits is important from the standpoint of maintaining constant sensitivity in each circuit; these keeping this sensitivity independent of the other bridge circuits which may be turned on and off by means of their switches 88.

The oscillator unit has therefore been designed to supply ample power so that the whole equipment sensitivity and operation conditions are independent of the number of bridge circuits simultaneously in use.

The oscillator is equipped with a dynamotor 222 which is used to supply the high voltage continuous current required by the four vacuum tubes. A conventional choke 224 and filter capacitors 226 and 228 are used to smooth the commutator ripple voltage.

The equipment is designed primarily for operation from a 12-volt storage battery, through binding posts 230, but for use on larger aircraft with a 24-volt electrical system, direct connection to the power lines may be made by means of 24-volt binding posts 232. When this connection is used, resisters 234 and 236 are in the circuit and limit the current to the same value as would be obtained for normal 12-volt operations. Switches 238 and 240 control the dynamotor and vacuum tube heater circuits, respectively. Pilot lights 242 and 244 give indication as to the operation of these two circuits, while fuses 246 and 248 give protection. An additional fuse 250 protects the high voltage circuits.

Fig. 13 shows the circuit diagram for the power supply unit of Fig. 1. This unit is used to supply the operating voltage and current required by the vacuum tubes used in all amplifier and demodulator units. High voltage for the plate supply of the vacuum tube is obtained from different sources according to the requirements of the various tubes, which may be divided into two classifications:

(a) Those used to secure voltage gain, but not required to supply much output power. Six tubes fall into this classification, three in each channel, that is to say, the first two stages of the high frequency amplifier and the single stage of the low frequency amplifier designated as tubes 100T, 102T and 124 in Figs 9 and 10 representing the vertical channel.

(b) Those used to deliver an appreciable amount of power. Four vacuum tubes fall into this classification, two in each channel, to wit: the push-pull power output stage, which is the third in the high frequency amplifier, these being tubes 104T, 106 in Fig. 9 representing the vertical channel.

Those vacuum tubes listed under (a) above, are supplied from a B-battery of 225 volts because variations in plate supply voltage to any of these tubes would cause serious disturbances, and a battery supply represents the simplest and most stable supply of voltage available. These vacuum tubes deliver little power and accordingly their plate current requirements are low. A very small, light weight battery housed in the power supply case is ample to supply all these tubes for many hours of operation. On the other hand, those vacuum tubes listed under (b) above, are used to deliver power sufficient for the operation of an electromagnetic oscillograph, and consequently they require relatively large amounts of plate current which could not well be supplied from a battery of reasonable size. Also, the push-pull arrangement makes these stages much less sensitive to variations in plate supply voltage. Accordingly, the power output tubes are supplied from two dynamotors, one for each channel. One dynamotor 260 is shown in Fig. 13 which supplies the vertical channel. Commutator ripple voltage is smoothed by the use of a conventional filter which includes a radio frequency choke 262 as well as an audiofrequency choke 264. A master switch 266 controls all power to the units comprising the vertical channel, and a pilot lamp 268 indicates whether or not the channel is in use. Fuses 270, 272, 276 protect the B-battery dynamotor input, and vacuum tube heater circuits, respectively. Fuse 278 protects the high voltage dynamotor circuit. This power supply unit is intended to operate from the same battery that supplies the oscillator unit. Accordingly, it is basically designed for a 12-volt input at binding posts 230, but resistors 280, 282, are provided in the connection from posts 232 to the 24-volt supply in the event that the unit is to be connected to a 24-volt power line of an aircraft. Resistors 280 and 282 are adjusted so that the input current for 24-volt operation is the same as that for 12-volt operation.

Duplicate equipment is furnished for the horizontal channel. The power connection plug 114 is shown having leads connected thereto only for the vertical channel. A single volt meter 284 is used in conjunction with a switch 286 which is common to the horizontal and vertical channels to provide a ready means of checking the performance of the power supply. Switch 286 is divided into two parts, 286a and 286b, both of which are operated from a single knob. The various positions of the switch permit volt meter readings of the battery input voltage, vacuum tube heater voltage, dynamotor input voltage, dynamotor output voltage, and B-battery voltage for each channel.

In many instances it is desirable to provide means for applying an artificial excitation of any desired, but variable, force to one or more points of an aircraft part. A simple arrangement for accomplishing this result is shown in Fig. 14. It consists of an electric motor 300 supplied with current by a circuit shown in Fig. 16. The armature 364 of the motor and the shunt field winding 366 are normally supplied with current by lines 301, 302 connected to the battery 304, line 301 containing a variable resistance or rheostat 303 and an on-off switch 368. Control of the motor, and stopping thereof, are obtained by a three-bladed switch 370, having blades 370a, 370b and 370c. Blades 370b and 370c are connected by conductor 372. Blade 370a is connected by line 371 to line 301 between switch 368 and rheostat 303, thus shunting the rheostat. The left-hand terminals 370₁, 370₂ and 370₃ of switch 370 are connected as follows: terminal 370₁ is dead; terminal 370₂ is connected to line 301 and thus through rheostat 303 to the battery 304; and terminal 370₃ is connected to the armature 364 of motor 300. The right hand terminals 370₄, 370₅ and 370₆ of switch 370 are connected as follows: terminal 370₄ is connected to line 301 and thereby to the shunt winding 366; terminal 370₅ is connected to a shunt resistance 374, which in turn is connected to the line 302 and thus to one side of armature 364; and terminal 370₆ is connected to the other side of armature 364.

The operation of this circuit is as follows: To operate motor 300, switch 370 is turned to the left, and switch 368 is closed. Current is then supplied to armature 364 and field winding 366 through rheostat 303. The current and therefore the speed of the motor can then be varied at will by the rheostat.

In an emergency it may be necessary to stop the motor quickly. Switch 370 is then turned to the right. Field winding 366 is then energized by the full current of the battery, since line 371 shunts out the rheostat. At the same time armature 364 is grounded across the resistance 374. A dynamic braking effect is thus produced on the armature which stops the motor almost instantaneously. Motor 300 drives shaft 305 having rigidly mounted thereon a disc 306 and rotatably carrying a disc 307, each disc having an eccentric weight 308. Bevel gears 309 on discs 306, 307 mesh with a rotatable gear 310 carried on a fixed shaft 311, so that discs 306, 307 rotate at the same speed in opposite directions. There is thus produced a unidirectional force without lateral components.

As a rule, only one artificial exciting mechanism is used on each part of the aircraft. However, where the system is used for testing a number of parts, it may include at least one such means on each part.

Fig. 15 shows the application of these vibration exciters, designated generally at 300 to an airplane part, in this case a wing 316. A plurality of pick-ups 2 are likewise distributed along the wing, one of them as close as possible to the vibrator. The rheostat 303 (Figs. 1 and 16) is arranged in the cabin of the aircraft, or at any other convenient point. The use of this arrangement will be described below.

In the assembling of the apparatus as compactly as possible, the switches, bridge circuits, amplifiers, demodulators, and filter are housed together. The oscilloscope is housed separately, and the oscillator and power supply are housed separately. Each of these three units of equipment is mounted on a special shock-proof base which protects the apparatus from the severe mechanical vibrations which are sometimes present during flight test conditions.

After the equipment is placed in a convenient position in an aircraft, a suitable length of cable is spliced onto the short pick-up connection and carried through the wings or other structure of the aircraft to the apparatus which contains the switches and bridge circuits. At the other end, the cable is fitted to a plug for easy and rapid connection to the equipment. If the carbon pile type pick-up unit disclosed in application Serial No. 214,562 is to be used, the parts of the apparatus needed for supplying alternating current for the new inductor type pick-up and the Demodulator unit are disconnected.

Modes of operation

The equipment described above may be operated to produce several different types of response. The application of carrier frequency current to the bridge circuits of Fig. 8 has been previously described, and the method of balancing the bridges discussed. Completely balanced bridge circuits have been implied. These give no output voltage as long as their pick-up units are not responding to any acceleration. Other modes of operation are as follows:

Completely balanced bridge operation

Figure 17A:
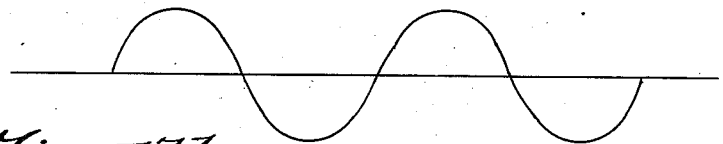

This type of operation may be visualized by reference to Figs. 17a to 17f, inclusive, which illustrates the performance obtained for various degrees of bridge balance. The several curves of these figures all have time as the horizontal coordinate, and, for all except the first, voltage is the vertical coordinate. The first curve, Fig. 17a, represents two cycles of a sinusoidal acceleration acting on a pick-up unit. This acceleration causes a corresponding displacement of the inductor of the pick-up with the result that the bridge circuit becomes periodically unbalanced and carrier frequency voltage appears as the output. This voltage is represented by the closely spaced waves shown in Fig. 17b. The horizontal separation is constant because of the constant frequency of the carrier and the amplitudes correspond to the degree of bridge unbalance. Smooth curves have been drawn through the positive and negative maxima to show the envelope, but these are purely fictitious and do not represent any voltage actually occurring in the bridge or "high frequency amplifier" circuits. It is clear that the accuracy with which the envelope can be deduced from the successive positive and negative maxima of carrier frequency depends on the number of cycles of carrier frequency per cycle of mechanical vibration, i. e., upon the ratio $$\frac{F_c}{F_m} = \frac{\text{carrier frequency}}{\text{mechanical frequency}}$$

The higher this ratio, the sharper will be the definition. The apparatus is specifically intended to operate up to a mechanical vibration frequency of 1200 cycles per minute or 20 cycles per second, while the carrier frequency used is 6000 cycles per second. Hence the minimum value of their ratio is 300. The equipment may be used on mechanical frequencies up to 9000 cycles per minute or 150 per second. This leads to a minimum ratio of 40 which still gives much better definition than that illustrated graphically in Figs. 17a to 17f. Definition will probably be satisfactory as long as the ratio exceeds a value of 10. For still higher mechanical frequencies, (as detected by a pick-up designed for them), the carrier frequency can be raised by readjusting the "oscillator." The actual oscillator used with the apparatus is suitable for use in the region 1000 to 18,000 cycles per second. If desired, this range could be greatly extended both above and below the present limits.

Figure 17B:
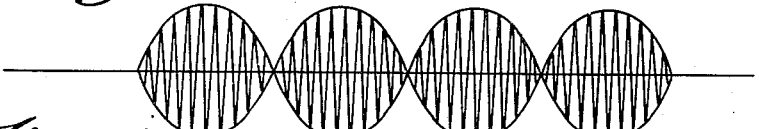
Figure 17C:
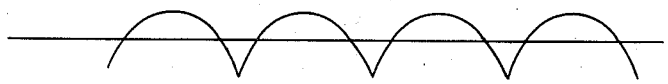

Referring again to Fig. 17b, it will be noted that the group of carrier frequency waves corresponding to the negative half cycles of acceleration (Fig. 17a) are practically identical with the carrier frequency wave groups due to positive half cycles of acceleration. That is, the envelope of Fig. 17b is periodic with twice the frequency of the imposed mechanical vibration. Also the envelope consists of two sine waves superimposed on each other in such a way that each is the mirrored reflection of the other. The net result is a considerable modification from the appearance of the acceleration wave of Fig. 17a. Fig. 17b represents the trace that would be secured on a film using an electromagnetic oscillograph. Actually the high frequency of the carrier would probably crowd the individual traces so that all space within the envelope would appear to be solid black. However, this figure could be interpreted in a very satisfactory manner. The "G-meter," Fig. 11, would also function satisfactorily on this wave. In fact, the transformer 190 and one of the rectifiers could be eliminated since an A. C. microammeter will function as a "G-meter" for the type of operation represented by Fig. 17b, where the average value of rectified voltage is proportional to the acceleration, being zero for zero acceleration. The disadvantage associated with the completely balanced system arise in connection with the use of the "Demodulator," "filter," and "oscilloscope." The voltage output of the "demodulator" is represented by Fig. 17c. If no filtering action is used, this is also the form of the trace which appears on the cathode ray screen. The double frequency and inversion of negative half cycles make the determination of phase relationship virtually impossible. Also this wave does not represent to the eye the form of the imposed acceleration. Harmonics, transients, etc., would complicate a trace of the type of curve in Fig. 17c very badly. Filtering action would not only remove higher frequency phenomena, but would also alter the form of the low frequency phenomena being investigated, because Fig. 17c, although derived from a simple sine wave, now consists of a Fourier series of sine waves comprising many higher harmonics. In view of these facts, a trace of the type Fig. 17c would not be satisfactory on the cathode ray screen, and if completely balanced bridge circuits are to be used, "demodulators" and "filters" are dispensed with; the output of the "high frequency amplifier" is applied directly to the "oscilloscope" so that its screen shows the trace Fig. 17b just as an electromagnetic oscillograph would. Filtering action is not available and phase relationships cannot be determined. A further difficulty with a completely balanced system lies in the fact that balance is complete for only one particular position of the pick-up unit. If the pick-up be tilted out of this orientation, the action of gravity on the inductor is altered so that its "at rest" position is changed and the system becomes unbalanced. Considering changes in attitude of an airplane in flight, landing, etc., it becomes apparent that the completely balanced system is not in general the most desirable, although it does give a means of measuring very low frequency (or even zero frequency, i. e., constant) accelerations.

*Completely unbalanced*

Figure 17D:
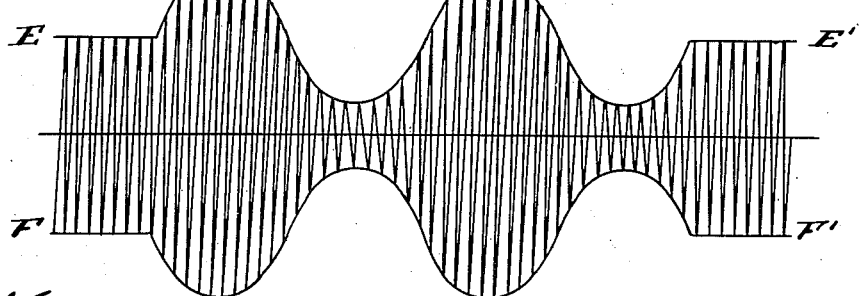
Figure 17E:
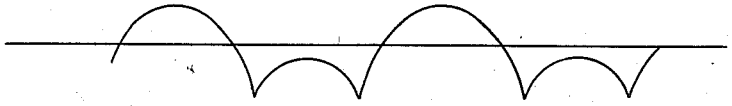

Another method of operation is to work with the bridge circuits considerably unbalanced initially. This system is illustrated by the curve of Fig. 17d. The imposed acceleration is again represented as for Fig. 17a. Before this acceleration begins (i. e. to the left of the starting point of the wave), the pick-up is represented as being at rest and the bridge output voltage is shown with a double amplitude of EF which represents the unbalance. At the conclusion of the two cycles of acceleration, the pick-up returns to an "at rest" condition and the unbalance voltage again amounts to E'F' which equal EF. During positive half cycles of acceleration, the motion of the pick-up inductor is represented as increasing the unbalance, thereby causing greater output voltage from the bridge circuit. Accordingly, for negative half cycles of acceleration, the unbalanced bridge output voltage is decreased, but the displacement of the inductor is never sufficient to balance the bridge and hence the output voltage never becomes zero. The trace appearing on an electromagnetic oscillograph would be as shown, except, of course, that the envelope EE' and FF' being purely fictitious would not appear. This type of modulation is very similar to that employed in radio broadcast transmission. The output of the "demodulator" is represented by the envelope line EE' which is clearly recognizable as a representation of the imposed acceleration of Fig. 17a. Provided that the frequency is within the transmission band of the "filter," the demodulated voltage EE' will pass unaltered to the "oscilloscope" and there produce a visible trace of the same form (EE'). This type of modulation is very satisfactory from the standpoint of producing a trace which represents the acceleration in conventional form so that effects of transients, harmonics, etc., are most readily recognizable. This type also permits use of the "filters" to the best advantage and makes phase determination as simple as possible. The representation on the electromagnetic oscillograph is even better than that obtained from the balanced system. The only disadvantage arises in connection with the "G-meter." A simple A. C. microammeter would be totally unsatisfactory since a reading corresponding to the unbalanced voltage EF would appear even with no imposed acceleration. Further, the increase in unbalanced voltage due to positive half cycles of acceleration is equalled by the decrease due to negative half cycles, so that the average as indicated by an A. C. microammeter would be totally unaffected by the acceleration. Hence not even changes in meter indication could be interpreted as imposed acceleration. This difficulty is overcome in the circuit of Fig. 11 by the use of the two rectifiers and the transformer 190. Carrier frequency current is rectified by 188 and applied as a pulsating continuous current to transformer 190. The pulsations produce a secondary A. C. voltage which is rectified by 186 and causes a deflection of the meter G. The effect of this arrangement is to saturate the magnetic circuit of 190 by the rectified continuous current and thereby to suppress to a large extent the deflection otherwise produced by the initial or "static" unbalance of the bridge circuit. When the carrier frequency voltage is modulated due to an acceleration, the average value of the rectified current changes and is effective in producing a secondary voltage and a meter deflection. The small meter deflection due to "static" unbalance is compensated by adjustment of the mechanical zero of the meter so that it reads zero for zero acceleration. Sensitivity to small values of acceleration is not great; but as the magnitude of the acceleration increases so that the reduction in rectified current (at the negative half cycles of acceleration) is effective in reducing the magnetic saturation, the sensitivity increases rapidly. The meter may therefore be used as a warning, adjusted to indicate whenever the structure carrying the pick-up is subjected to an average acceleration exceeding a predetermined amount.

*Over modulated operation*

Figure 17F:
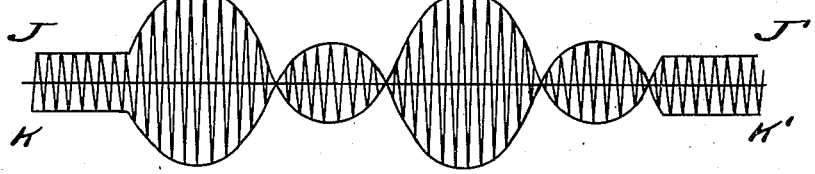

This type of operation is illustrated in Fig. 17f. The acceleration is applied to a pick-up whose bridge circuit has an initial unbalance of JK. The increase in unbalance due to the positive half cycles of acceleration causes an increase in carrier voltage just as for Fig. 17d, but during the negative half cycles, the inductor moves far enough to balance the bridge and then moves on to unbalance it in the opposite direction before beginning its return motion. This condition corresponds to what is called "over-modulation" in the terminology of radio. Twice for each cycle the voltage becomes zero corresponding to the two instantaneous bridge balances, and twice for each cycle the voltage starts at zero, increases to a maximum, and then decreases to zero. This is similar to the balanced bridge modulation of Fig. 17b, but here one set of maxima are greater than the other, due to the initial bridge unbalance. The demodulated voltage is shown at Fig. 17g and in common with Fig. 17c this voltage is non-sinusoidal, making the use of filters, determination of phase relationship and viewing in the oscilloscope generally unsatisfactory. However, if the magnitude of the imposed acceleration had been smaller, so that the pick-up inductor would never move far enough to balance the bridge, then the appearance of Fig. 17f would have been similar to that of Fig. 17d except on a smaller scale as indicating the reduced amount of acceleration. Thus, operation as a completely unbalanced bridge, or operation as an over-modulated circuit is determined entirely by the magnitude of the imposed acceleration as compared to the initial unbalance. In speaking of Fig. 17d as being representative of completely unbalanced operation, it was simply assumed that the unbalance EF is so great that no acceleration to be imposed on the pick-up will be of a magnitude sufficient to cause over-modulation. The system represented by Fig. 17f may actually have some advantage over Fig. 17d if the initial unbalance of the system is adjusted so that over-modulation occurs only when the imposed acceleration is so great as to be dangerous to the structure. The "G-meter" can be adjusted to increase its deflection sharply in response to over-modulation and this serves as an immediate warning to those conducting the test. Once the system has been properly adjusted, the warning is obtained without reference to gain control setting, calibration charts, etc., that are necessary before oscilloscope observations can be interpreted to obtain the warning. The "G-meter" is more sensitive to increasing values of acceleration after over-modulation occurs than before; because before over-modulation, the average value of rectified current is independent of the acceleration; while after, the average rectified current increases with increase of acceleration. Before over-modulation, i. e., while the accelerations acting on the structure carrying the pick-up are limited to safe values, the system behaves similarly to Fig. 17d and allows maximum effectiveness of "demodulator," "filter," and "oscilloscope." Also due to the smaller amount of unbalance, sensitivity may actually be improved.

A carbon pile type of pick-up has been described in application Serial No. 214,562. This pick-up could replace the inductor pick-up unit and be used with the newly described carrier frequency system of equipment. This use is in addition to its use with the older portions of the equipment functioning in the originally described manner as a Wheatstone's bridge circuit operating on continuous current. The new use of this pick-up unit with the carrier frequency system would improve the response to low frequency phenomena.

The newly described magnetic pick-up unit can be used with arrangements of measuring equipment other than that specifically described above. For example, bridge circuits might be dispensed with and the carrier frequency circuit connected to only one of the two coils. Voltage would be induced in the other coil by transformer action; the amount of the voltage being influenced by the position of the inductor so that modulated wave of the type shown in Fig. 17d could be produced without a bridge circuit. If this system were to be used, it would probably be desirable to make some modification of the arrangement of the pick-up coils and/or magnetic circuit so that the motion of the inductor would be more effective in controlling the voltage induced in one coil by current in the other. A coil wound on the moving member itself would be effective; or the substitution of a cylindrical air gap in place of the place gap used at one of the two "working" air gaps would improve sensitivity. Also the number of coils in the unit need not be limited to two.

The magnetic pick-up in its present form could be used in a continuous current bridge circuit to replace a carbon pile type unit. The current flowing would produce a steady magnetic field and motion of the inductor would modify this field to induce voltages in the coils. If a permanent magnet were substituted for the soft iron inductor, its motion in response to vibration would induce voltages in the coils. The voltage from one or both coils could be fed into an amplifier without the use of a bridge circuit. As another possible modification, the magnet action could be obtained with an electromagnet rather than a permanent magnet. It would be necessary to supply continuous current to a coil which would act as the magnetizing coil. For a system such as this, modifications of the pick-up coils and/or magnetic circuit, as described above for carrier current operation without a bridge circuit, would improve sensitivity.

Any use of the magnetic pick-up with a continuous current system or with a built-in permanent magnet would result in decreased sensitivity at low frequencies. The alternating current (carrier) systems as previously described lead to an output voltage which is proportional to the acceleration to which the pick-up is responding. In the case of a sinusoidal vibration, this means that for a given amplitude of motion, the output voltage is proportional to the square of the frequency. As compared to this, the continuous current or permanent magnet arrangements would yield an output voltage proportional to the cube of the frequency. Thus the loss of sensitivity at low frequency would be even greater. This is the basic reason for the selection of the carrier frequency system for the present equipment.

In actual testing of an aircraft, the apparatus above described is adequate to permit the carrying out of the procedure which forms the subject of this application. This procedure will be described in full, although it will be understood that for many purposes some of the steps thereof may be omitted.

As is well known, many bending vibrations are of such a nature that nodes occur. As shown in Fig. 15, for example, an airplane wing may bend about one or several nodes. In this figure, the dash line 320 represents the center line of the wing in normal conditions. If the wing is subjected to a force such as to cause a longitudinal bending, this line will change to the position indicated by the dotted line 322. It will be noted that in this bending a node 326 exists.

The nodes may be determined with sufficiently close approximation either by ground testing or by calculation. The general methods for this are well known and form no part of the invention.

If the aircraft in flight encounters a sudden change in conditions, as when it strikes a gust, the whole wing or other part being tested will of course be subjected to acceleration. At the same time, the wing will be deformed. In other words, as shown in Fig. 15, center line 320 will be deflected parallel to line 322, but at the same time will shift to the position indicated by the dot-and-dash line 328.

Obviously each point of the wing has undergone an acceleration. With a single pick-up, it is not possible to determine, however, what proportion of this acceleration is due to movement of the part as a whole, and what part to distortion of the part. As shown in Fig. 15, for example, nodal point 326 of line 320 drops a distance $a$ to position 332. On the other hand, another point 324, because of the distortion of line 322, drops to a position 330, through a distance $a+x$ (of course, for many points this value would be $a-x$). In other words, the movement $x$ caused by distortion is much less in many instances than the bodily movement, but the two cannot be separately distinguished by a single pick-up.

Of course, since movements $a$ and $a+x$ occur in the same length of time, the velocities and acceleration of the two points are different.

For overcoming this difficulty we provide a plurality of pick-ups on the part to be tested. For example, pick-ups 2a and 2b can be located on the wing at points 326 and 324 respectively. In using the apparatus, with reference to Fig. 8, pick-up 2a might have inductances 95 and 97, and pick-up 2b inductances 95a and 97a. The parts are then switched in such a manner as to find the algebraic difference between the movements of points 326 and 324. Since the current flowing in each of the bridges is proportional to the acceleration of the point where the corresponding pick-up is located, the difference between these currents will be a definite indication of the difference in acceleration of the two points.

Switches 84 and 84a (Fig. 8) are both set to supply current to transformer 86a. On the other hand, switches 82 and 82a are set oppositely from each other, so as to set the bridges out of phase with one another. The accelerations of pick-up 2a (assumed to be less than those of pick-up 2b) would then produce on the oscilloscope a pattern of the general shape of sine curve 338 (Fig. 17g). Pick-up 2b would produce a pattern like sine curve 340. The resultant of the two currents together will therefore produce a resultant sine curve 342 which will be an indication of the value $x$, or of the difference in accelerations of the two points 326 and 324, or, in other words, the acceleration due to distortion of the wing.

By determining the values for a number of points along the wing, the mode of vibration of the wing including the location of nodes may be accurately determined. It should be noted, particularly, however, that the determination and use of nodal points is not essential to this phase of the invention in its broadest aspects, since, as pointed out above, use may be made of pick-ups located on opposite sides of an elastic axis, or at various other points. The principal concept lies in the use of the combined measurements from a plurality of pick-ups located at different points, and in the electrical combination of the currents or other electrical phenomena which are proportional to the accelerations of the pick-ups.

Testing of this type may also be applied by means of the apparatus described to the complete wing span, for example, in the manner shown in Fig. 18. In this figure, line 343 represents the initial position of the wing centerline before striking a gust. This gust in the example shown both raises and tilts the aircraft, so that the normal centerline of the wing takes the inclined position indicated by line 344. At the same time, however, the wing is bent and the centerline takes the position 345.

Pickups 2 are located two at each of the nodes 346, 348 and also one at each of points 350, 352 located preferably at about 75% of the distance from the centerline of the aircraft to the wing tips. Assuming the movement of nodes 346 and 348 to be NL and NR respectively, it will be apparent that the average movement of the wing will be $$\frac{NL+NR}{2}$$

which is identified as AN. At the same time, the movement of points 350 and 352 from the original line 343 will be called AL and AR respectively. It is apparent that the total deflection of points 350, 352 from line 344 will be 2 AN−(AL−AR) (proper weight being given of course to the sign of these values), or proportional to $$\frac{AL+AR}{2} - AN$$

(identified as AT) considering upward directions positive (+) relative to original line 343.

Now the acceleration of the vibration obviously varies with the force, as does the translatory movement of the whole wing. That is, while AN is dependent upon the gust intensity, it is dependent upon the speed only insofar as variation in speed for a given gust intensity alters the effective instantaneous angle of attack of the part. This effect, of course, is already well known and is taken into account in structural design. AT, on the other hand, is not only dependent both upon gust intensity and upon variations in the effective instantaneous angle of attack caused by variations in speed, as is AN but is also dependent upon an additional speed effect, the latter effect being a function of the aerodynamic damping. AT/AN will therefore be independent of the gust intensity and the effect of speed upon the instantaneous angle of attack, which are common to all parts, and will therefore vary with the effect of speed on the aerodynamic damping only. AT/AN will therefore be independent of gust intensity and will vary with changes in speed only, so that changes in the acceleration of the vibratory movement movement within the part may be determined by variations in the value of AT/AN. This also of course indicates the comparative value of the damping force.

For this purpose, the signals from one of the pick-ups at each node will be added and averaged by the mechanism. One of the resulting average values (AN) will be applied to the horizontal plates of the oscilloscope. The output of pick-ups at points 350, 352 will also be averaged and from this average will be subtracted the average from the nodal pick-ups. The resulting signal (AT) is then applied to the vertical plates of the oscilloscope. There will then appear on the oscilloscope screen a line whose slope will represent the value $$\frac{AT}{AN}$$

As the value of AT increases with respect to AN, because of an increase in vibration caused by change in speed, the line will approach more closely to the vertical. As the line approaches the vertical, it is an indication that damping is decreasing and that the critical speed is being approached. By observing and plotting the values at varying speeds it is possible to extrapolate to the critical speed.

Figs. 14 to 16 and 17h relate also to the use of artificial excitation. For many purposes, the forces causing natural vibration of a part may be quite variable under some conditions, and therefore difficult to measure accurately, and may increase quite rapidly with changes in the conditions, such as a sudden gust. With forces of this type it may be impossible to plot a speed-vibratory force curve accurately, since the force causing the vibrations will be impossible of accurate measurement. It is already known that for some purposes vibrations may be produced by the addition of an unvarying extraneous or artificial exciting force.

The present invention makes use of a measured, variable artificial exciting force. As shown in Fig. 17h, for example, let it be assumed that the line 360 represents an amplitude of a predetermined value and a given frequency, equal to that of the exciting force. Then the power necessary to produce this amplitude will be variable, depending on the damping force, according to the well known equation:

$$D = \frac{P}{(An)^2}$$

wherein

D is the damping force
P is the power
A is the acceleration, and
n is the frequency.

We have determined that in practically all cases the power curve, represented by line 362 of Fig. 17h, rises at low speeds and then drops. The last part of the curve, represented by the broken lines, is substantially straight. Thus by determining the power at varying speeds until the curve plotted extends generally straight, a continuation of this straight portion to its intersection with the zero axis will indicate the critical speed with considerable accuracy.

Of course it is not necessary to keep the acceleration at a constant value, as long as it is kept below a predetermined danger point. Measurement of the acceleration and power with any value of each will make it possible to compute the power for a constant acceleration and thus to plot the curve of Fig. 17h.

The measurement of the power, or the ascertainment of the damping force, is preferably accomplished by measurement of the phase angle φ between the exciting force and the vibrations produced thereby. The recognized formula $$\frac{F \sin \phi}{An} = \frac{P}{(An)^2} = D$$

where F is the vibrator force, and φ is the phase angle will give the power when the force, acceleration, frequency and phase angle are known. The first three of these may be found from the oscilloscope reading, while the phase angle may be determined in any well known manner.

In actual practice, the airplane is taken up into smooth air when it is not subject to dangerous gust excitation. At the beginning of a flight test, for example, if artificial excitation is used, the rheostat 303 for the motor 300 at point 324 would be set to supply maximum power to the motor. With reference to Fig. 17h in which the power and amplitude are plotted as ordinates against speed as the abscissa, it will be noted that at low speeds, the power required to produce the amplitude represented by line 360 is quite small.

As will be noted, the artificial force is gradually increased to a maximum and then reduced as the speed increases. This is accomplished in the mechanism shown by turning rheostat 303 to reduce the supply of current to motor 300. If this were not done, the amplitude might become dangerously high. Thus a dangerous force might be exerted long before the critical speed is reached, and the test would not indicate the true critical speed without endangering the safety of the aircraft. It is important, therefore, by constant observation of the oscilloscope, to reduce the artificial exciting force to such a degree that the artificial force never reaches a dangerous value.

By plotting the power of the artificial force from the phase angle formula as line 362, until the downward part of this line is substantially straight extrapolation of the line as indicated by the broken part in Fig. 17h will by intersection with the x-axis indicate the critical speed. The increase in speed is then stopped.

Having now described a means by which the objects of this invention may be obtained, what we claim as new and desire to secure by Letters Patent is:

1. A method of testing aircraft for critical flutter speed, comprising determining a nodal point of an aircraft part, measuring while in flight some variable which is proportional to the force acting on such nodal point and on a non-nodal point of the part, combining the results of such measurements, plotting the combined results against the speed of the aircraft to determine a curve, and extrapolating such curve to its asymptote from a lower speed than that of the asymptote to determine critical speed without bringing the speed of the aircraft thereto.

2. A method of testing an aircraft part for periodic instability which comprises applying to said part a localized artificial exciting force, operating said aircraft under conditions to apply a variable damping force to said part, varying the power of said artificial exciting force in such a manner as to maintain the desired amplitude of movement of said part below a given maximum, determining the power of the artificial exciting force, and determining from corresponding values of power and amplitude the instability characteristics of the part.

3. A method of testing an aircraft part for critical speed which comprises applying locally to said part in flight an artificial exciting force to produce vibrations of such part; operating said aircraft at varying speeds to apply a variable damping force to said part, gradually reducing the power of said artificial exciting force as the speed increases in such a manner as to maintain the desired amplitude of movement of said part below a given maximum, determining the power of the artificial exciting force, plotting the power against the speeds to form a curve, and extrapolating said curve to its intersection with the speed axis to determine the critical speed without increasing the speed of the aircraft to that represented by such intersection.

4. In a method as claimed in claim 3, the step of determining the phase angle between the artificial force and the vibrations produced thereby and therefrom evaluating the power of said force.

5. A method of testing aircraft, comprising subjecting a portion of an aircraft while in flight to shock excitation resulting from gusts, measuring at a plurality of incrementally increased given air speeds the amplitude of motion and the damping of said portion of the aircraft as the vibratory motion thus induced diminishes toward zero, and determining the rate of decay of motion produced by such shock excitation at each of the given air speeds to obtain the increasing rate of change of damping effects with increase of air speed indicative of approach to flutter.

6. A method of testing aircraft, comprising subjecting a portion of an aircraft while in flight to a momentarily applied vibration producing force in addition to the normal forces resulting from flight in smooth air, measuring respectively at a plurality of incrementally increased given air speeds the amplitude of motion and the damping of said portion of the aircraft as the augmented vibratory motion thus induced at each given air speed diminishes toward zero, and determining the rate of decay of motion produced by such additional vibration producing force at each of the given air speeds to obtain the increasing rate of change of damping with increase of air speed indicative of approach to flutter.

7. A method for determining by flight test the critical flutter speed of an aircraft, comprising measuring the vibrations of a plurality of points on an aircraft, combining the vibration measurements at said points so as to separate the torsional and bending responses, plotting the values represented by one of such separated impulses against the respective air speeds to form a curve, and extrapolating such curve to its asymptote without increasing the air speed to that represented by such asymptote, which asymptote indicates the critical flutter speed of the aircraft.

8. The method of testing an aircraft for flutter while in flight which comprises superimposing a localized periodic exciting force of known magnitude and frequency on a normally vibrating surface of the aircraft, and measuring the effect of the superimposed localized force upon the vibrating surface to determine approach of the surface to resonance.

9. A method of testing aircraft for flutter which comprises exciting a surface of the aircraft while in flight with a periodic force of known magnitude and frequency, progressively varying the frequency of said periodic force until it approaches the critical frequency of the aircraft surface for flutter, and at each frequency of said periodic force measuring the amplitude of response of the surface to said periodic force to determine the approach of the surface to resonance.

10. A method of testing aircraft which comprises exciting a surface of the aircraft while in flight with a superimposed periodic force of known magnitude and constant frequency, varying the magnitude of said periodic force with known changes in air speed so as to maintain a constant relatively small amplitude of response for the surface, and determining at each speed the magnitude of said periodic force as it approaches zero with increase of air speed to a critical flutter value.

EDWARD E. MINOR.
STANLEY A. KILPATRICK.